United States Patent
Zhang et al.

(10) Patent No.: US 11,050,649 B2
(45) Date of Patent: Jun. 29, 2021

(54) DELAY MEASUREMENT METHOD OF NETWORK NODE DEVICE, APPARATUS, AND NETWORK NODE DEVICE

(71) Applicant: HUAWEI TECHNOLOGIES CO., LTD., Guangdong (CN)

(72) Inventors: Xiquan Zhang, Dongguan (CN); Jianmin Song, Dongguan (CN); Jiahong Wei, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 4 days.

(21) Appl. No.: 16/432,647

(22) Filed: Jun. 5, 2019

(65) Prior Publication Data

US 2019/0288930 A1 Sep. 19, 2019

Related U.S. Application Data

(63) Continuation of application No. PCT/CN2017/093885, filed on Jul. 21, 2017.

(30) Foreign Application Priority Data

Dec. 15, 2016 (CN) .......................... 201611159723.1

(51) Int. Cl.
*H04L 12/26* (2006.01)
*H04L 12/851* (2013.01)

(52) U.S. Cl.
CPC .......... *H04L 43/0852* (2013.01); *H04L 43/16* (2013.01); *H04L 47/2441* (2013.01)

(58) Field of Classification Search
CPC . H04L 43/00; H04L 43/0858; H04L 43/0852; H04L 43/0864; H04L 43/16;
(Continued)

(56) References Cited

U.S. PATENT DOCUMENTS 6,661,922 B1 * 12/2003 Boettcher ............... G06F 17/18
382/225
2004/0143663 A1 7/2004 Leedom et al.
(Continued)

FOREIGN PATENT DOCUMENTS

CN 101534222 A 9/2009
CN 101834901 A 9/2010
(Continued)

OTHER PUBLICATIONS

TSG SA Meeting #74, TR 22.886 on Study on enhancement of 3GPP Support for 5G V2X Services, Version 2.0.0, 3GPP TSG SA Meeting #74 Vienna, Austria, Dec. 7-9, 2016, SP-160902, 1 page.
(Continued)

*Primary Examiner* — Ian N Moore
*Assistant Examiner* — Sun Jong Kim
(74) *Attorney, Agent, or Firm* — Womble Bond Dickinson (US) LLP

(57) ABSTRACT

A method of delay measurement of a network node device is disclosed. The method includes obtaining a node delay value of a current packet when a preset time period starts. The method further includes determining, based on M+1 boundary values of preset M delay intervals, a delay interval in which the node delay value is located, and adding 1 to a value of a delay segment counter corresponding to the delay interval in which the node delay value is located, where M>1, M is a positive integer. The method further includes obtaining a node delay value of a next packet until the preset time period ends. The method further includes determining a cumulative probability $P_{acc,j}$ that is greater than or equal to a target probability, and obtaining, as a delay threshold, a node delay value having the target probability.

10 Claims, 12 Drawing Sheets

(58) Field of Classification Search
CPC . H04L 43/106; H04L 43/022; H04L 47/2441; G06F 11/3041; G06F 11/3089
See application file for complete search history.

(56) References Cited

U.S. PATENT DOCUMENTS

| | | | |
|---|---|---|---|
| 2007/0074138 A1* | 3/2007 | Homma | G06F 30/3323 716/108 |
| 2007/0274583 A1* | 11/2007 | Sugiyama | G06T 11/008 382/131 |
| 2009/0089092 A1 | 4/2009 | Johnson et al. | |
| 2012/0179434 A1* | 7/2012 | Hollis | G06F 30/367 703/2 |
| 2014/0160960 A1* | 6/2014 | Qi | H04W 24/00 370/252 |
| 2018/0287899 A1 | 10/2018 | Fujiwaka | |
| 2018/0316625 A1 | 11/2018 | Xu et al. | |

FOREIGN PATENT DOCUMENTS

| | | |
|---|---|---|
| CN | 101848118 A | 9/2010 |
| CN | 102013942 A | 4/2011 |
| CN | 103428770 A | 12/2013 |
| CN | 104811919 A | 7/2015 |
| CN | 105376112 A | 3/2016 |
| WO | 2004/017221 A1 | 2/2004 |
| WO | 2016/075924 A1 | 5/2016 |

OTHER PUBLICATIONS

NGMN Alliance, Perspectives on Vertical Industries and Implications for 5G. Version:1.0, Oct. 6, 2016, 29 pages.

3GPP TR 22.886 V2.0.0 (Dec. 2016), 3rd Generation Partnership Project; Technical Specification Group Services and System Aspects; Study on enhancement of 3GPP Support for 5G V2X Services(Release 15), 57 pages.

* cited by examiner

DELAY MEASUREMENT METHOD OF NETWORK NODE DEVICE, APPARATUS, AND NETWORK NODE DEVICE

CROSS-REFERENCE TO RELATED APPLICATIONS

This application is a continuation of International Application No. PCT/CN2017/093885, filed on Jul. 21, 2017, which claims priority to Chinese Patent Application No. 201611159723.1, filed on Dec. 15, 2016. The disclosures of the aforementioned applications are hereby incorporated by reference in their entireties.

TECHNICAL FIELD

The present disclosure relates to the field of communications technologies, and more specifically, to a delay measurement method of a network node device, an apparatus, and the network node device.

BACKGROUND

It is learned from current research and development of 5G (5th Generation) communications technologies that a 5G network architecture is a sliced network, and there is a low-latency service slice. Therefore, network operation services of an end-to-end delay and a point-to-point delay impose a higher requirement for reliability of entire-network delay performance.

With application and development of a delay-sensitive service such as virtual reality or automated driving, an end-to-end delay measurement technology such as TWAMP (Two-Way Active Measurement Protocol) or IP FPM (Flow Performance Measurement) in the prior art is usually used in an entire-network path planning and deployment process of the delay-sensitive service. In a process of performing delay performance measurement, the TWAMP is used to perform sampling measurement on a path based on a constructed measurement packet, and a measurement result of the TWAMP reflects a delay result of an end-to-end full path between a transmit end and a receive end of the path. The IP FPM is used to perform sampling recording on an actual packet and measure an actual forwarding time of the packet in a network, and an obtained measurement result also reflects a delay result of an end-to-end full path between a transmit end and a receive end of the path.

The two end-to-end delay measurement technologies in the prior art both reflect the delay result of the end-to-end full path from the transmit end to the receive end. If a communication link between the transmit end and the receive end includes at least one network node, a delay result of an end-to-end full path obtained by using the end-to-end delay measurement technology in the prior art cannot reflect a node delay generated when the network node processes a packet. Consequently, delay reliability of the network node on the communication link cannot be quantitatively evaluated and monitored.

SUMMARY

In view of this, the present disclosure provides a delay measurement method of a network node device, an apparatus, and the network node device, to measure a node delay generated when a network node on a communication link between a transmit end and a receive end processes a packet, and quantitatively evaluate and monitor delay reliability of the network node on the communication link.

The present disclosure provides the following technical solutions:

A first aspect of the present disclosure discloses a delay measurement method of a network node device, where the network node device includes a delay measurement apparatus, and the delay measurement method includes:

obtaining, by the delay measurement apparatus, a node delay value of a current packet when a preset time period starts, where the node delay value is used to indicate a delay generated when the current packet is forwarded from an ingress port of the network node device to an egress port of the network node device;

determining, by the delay measurement apparatus based on M+1 boundary values of preset M delay intervals, a delay interval in which the node delay value is located, and adding 1 to a value of a delay segment counter corresponding to the delay interval in which the node delay value is located, where M>1, M is a positive integer, the delay interval in which the node delay value is located belongs to the M delay intervals, and each delay interval corresponds to one delay segment counter;

returning, by the delay measurement apparatus, and obtaining a node delay value of a next packet until the preset time period ends; and calculating, by the delay measurement apparatus, a cumulative probability $P_{acc,j}$, determining a cumulative probability $P_{acc,j}$ that is greater than or equal to a target probability, and obtaining, as a delay threshold, a node delay value that meets the target probability, where the cumulative probability $P_{acc,j} = C_{acc,j}/C_{total}$, $C_{acc,j}$ is a sum obtained by accumulating from a value of a first delay segment counter to a value of a $j^{th}$ delay segment counter, $1 \leq j \leq M$, j is a positive integer, and $C_{total}$ is a sum $C_{total}$ of values of M delay segment counters in the preset time period.

In the present disclosure, the delay measurement apparatus performs corresponding delay measurement on the node delay value generated when the packet is transmitted from the ingress port of the network node device to the egress port of the network node device. Serviceability, availability, and reliability of delay performance of the network node device can be evaluated based on obtained delay measurement data. Therefore, precise quantitative evaluation and monitoring of delay reliability of the network node device can be completed based on comprehensive delay measurement data.

In a first implementation disclosed in the first aspect of the present disclosure, the determining a cumulative probability $P_{acc,j}$ that is greater than or equal to a target probability, and obtaining, as a delay threshold, a node delay value that meets the target probability includes:

when obtaining a cumulative probability $P_{acc,j}$ that is equal to the target probability, obtaining, by the delay measurement apparatus as the delay threshold, the node delay value that meets the target probability; or when obtaining a cumulative probability $P_{acc,j}$ that is greater than the target probability, obtaining, by the delay measurement apparatus, the $j^{th}$ delay segment counter when calculating the cumulative probability $P_{acc,j}$, and determining boundary values $D_{j-1}$ and $D_j$ of a delay interval corresponding to the $j^{th}$ delay segment counter; and searching, by the delay measurement apparatus between the boundary value $D_{j-1}$ and the boundary value $D_j$, for a node delay value that meets the target probability, and using, as the delay threshold, the node delay value that meets the target probability.

In the present disclosure, the delay measurement apparatus compares the target probability with a dynamically calculated cumulative probability, and obtains the node delay value corresponding to the target probability as the delay threshold when obtaining the cumulative probability that is equal to the target probability. When obtaining the cumulative probability that is greater than the target probability, the delay measurement apparatus needs to search, within the determined delay interval, for a node delay value corresponding to the target probability and use the node delay value corresponding to the target probability as the delay threshold. A probability distribution of a node delay value obtained by a currently measured network node device is determined by using the delay threshold, and the delay threshold may be further used to evaluate delay performance of the network node device.

In a second implementation disclosed in the first aspect of the present disclosure, the method further includes:

determining, by the delay measurement apparatus, a maximum node delay value and a minimum node delay value in node delay values obtained in the preset time period;

determining, by the delay measurement apparatus, a delay interval between the maximum node delay value and the minimum node delay value, and obtaining a quantity of valid delay segment counters corresponding to the delay interval, where the valid delay segment counters are delay segment counters that perform counting in the preset time period; and obtaining, by the delay measurement apparatus, a probability density curve f(x) through fitting calculation based on a distribution function and values of a determined quantity of valid delay segment counters, where x is a random variable and varies with the values of the determined quantity of valid delay segment counters.

In the present disclosure, the delay measurement apparatus determines the maximum node delay value and the minimum node delay value in the preset time period, determines the valid delay segment counters based on the maximum node delay value and the minimum node delay value, uses the values in the valid delay segment counters to obtain the probability density curve through fitting calculation, and uses the probability density curve to make subsequent delay probability measurement more precise.

In a third implementation disclosed in the first aspect of the present disclosure based on the second implementation, the determining a cumulative probability $P_{acc\_j}$ that is greater than or equal to a target probability, and obtaining, as a delay threshold, a node delay value that meets the target probability includes:

when obtaining a cumulative probability $P_{acc\_j}$ that is equal to the target probability, obtaining, by the delay measurement apparatus as the delay threshold, the corresponding node delay value that meets the target probability; or when obtaining the cumulative probability $P_{acc\_j}$ that is greater than the target probability, determining, by the delay measurement apparatus on the probability density curve f(x), a node delay value that meets the target probability, and using, as the delay threshold, the node delay value that meets the target probability.

In the present disclosure, the delay measurement apparatus may obtain, according to the probability density curve, a more precise node delay value that meets the target probability.

In a fourth implementation disclosed in the first aspect of the present disclosure based on the second implementation, the method further includes:

calculating, by the delay measurement apparatus, an average delay value of node delay values that are of all packets and that are obtained in the preset time period; and determining, by the delay measurement apparatus, a node delay value that is corresponding to the average delay value and that is on the probability density curve f(x), where the node delay value corresponding to the average delay value is used to measure node delay performance of the network node device.

In a fifth implementation disclosed in the first aspect of the present disclosure, the method further includes: classifying, by the delay measurement apparatus, the node delay value of the current packet based on a forwarding priority of the current packet, an ID number of a service flow in which the current packet is located, or a port number of a port through which the current packet is input to the network node device.

In the present disclosure, the delay measurement apparatus may perform category-based measurement on the node delay value of the network node according to different application requirements. With category-based measurement on the node delay value, a node delay value that meets a corresponding application requirement may be collected more pertinently, so that in a process of precisely evaluating and monitoring serviceability, availability, and reliability of a network node delay, pertinence can be improved, and power consumption can be reduced.

In a sixth implementation disclosed in the first aspect of the present disclosure, the method further includes: presetting a delay interval;

obtaining, by the delay measurement apparatus, a basic delay value range, a maximum node delay value, and a theoretically minimum node delay value of the network node device, where the basic delay value range is determined based on a physical structure of the network node device, the maximum node delay value is a maximum node delay value allowed by the network node device in a congestion case, and the theoretically minimum node delay value is a minimum node delay value of the network node device in a theoretical state;

determining, by the delay measurement apparatus, a to-be-divided node delay value range based on the theoretically minimum node delay value and the maximum node delay value; and dividing, by the delay measurement apparatus, the to-be-divided node delay value range based on a long-tailed distribution and the basic delay value range, to obtain M delay intervals and M+1 delay boundary values, and configuring one delay segment counter for each delay interval, where the long-tailed distribution indicates that a divided length of a delay interval that is closer to and within the basic delay value range is shorter, and a divided length of a delay interval that is farther away from the basic delay value range is longer.

In a seventh implementation disclosed in the first aspect of the present disclosure, the method further includes:

obtaining a link delay value with another network node in the preset time period for statistics collection.

In the present disclosure, the delay measurement apparatus can complete better quantitative evaluation and monitoring of the serviceability, the availability, and the reliability of the network node delay after obtaining and combining the link delay value between network node devices and a node delay value of each network node.

A delay measurement apparatus disclosed in a second aspect of the present disclosure includes:

a delay distribution measurement module, configured to: obtain a node delay value of a current packet when a preset time period starts, where the node delay value is used to indicate a delay generated when the current packet is forwarded from an ingress port of a network node device to an egress port of the network node device; determine, based on M+1 boundary values of preset M delay intervals, a delay interval in which the node delay value is located, and add 1 to a value of a delay segment counter corresponding to the delay interval in which the node delay value is located, where M>1, M is a positive integer, the delay interval in which the node delay value is located belongs to the M delay intervals, and each delay interval corresponds to one delay segment counter; return and obtain a node delay value of a next packet until the preset time period ends; and send a value of each delay segment counter to a delay probability measurement module; and the delay probability measurement module, configured to: calculate a cumulative probability $P_{acc,j}$, determine a cumulative probability $P_{acc,j}$ that is greater than or equal to a target probability, and obtain, as a delay threshold, a node delay value that meets the target probability, where the cumulative probability $P_{acc,j}=C_{acc,j}/C_{total}$, $C_{acc,j}$ is a sum obtained by accumulating from a value of a first delay segment counter to a value of a $j^{th}$ delay segment counter, $1<j\leq M$, j is a positive integer, and $C_{total}$ is a sum $C_{total}$ of values of M delay segment counters in the preset time period.

In a first implementation disclosed in the second aspect of the present disclosure, the delay probability measurement module includes:

a first obtaining unit, configured to: when the delay probability measurement module obtains a cumulative probability $P_{acc,j}$ that is equal to the target probability, obtain, as the delay threshold, the node delay value that meets the target probability; and a second obtaining unit, configured to: when the delay probability measurement module obtains a cumulative probability $P_{acc,j}$ that is greater than the target probability, obtain the $j^{th}$ delay segment counter when calculating the cumulative probability $P_{acc,j}$, and determine boundary values $D_{j-1}$ and $D_j$ of a delay interval corresponding to the $j^{th}$ delay segment counter; and search, between the boundary value $D_{j-1}$ and the boundary value $D_j$, for a node delay value that meets the target probability, and use, as the delay threshold, the node delay value that meets the target probability.

In a second implementation disclosed in the second aspect of the present disclosure, the delay measurement apparatus further includes a delay feature measurement module; and the delay feature measurement module is configured to: determine a maximum node delay value and a minimum node delay value in node delay values obtained in the preset time period; determine a delay interval between the maximum node delay value and the minimum node delay value, and obtain a quantity of valid delay segment counters corresponding to the delay interval, where the valid delay segment counters are delay segment counters that perform counting in the preset time period; and obtain a probability density curve f(x) through fitting calculation based on a distribution function and values of a determined quantity of valid delay segment counters, and send the probability density curve f(x) to the delay probability measurement module, where x is a random variable and varies with the values of the determined quantity of valid delay segment counters.

In a third implementation disclosed in the second aspect of the present disclosure, the delay probability measurement module includes:

a first obtaining unit, configured to: when the delay probability measurement module obtains a cumulative probability $P_{acc,j}$ that is equal to the target probability, obtain, as the delay threshold, the node delay value that meets the target probability; and a third obtaining unit, configured to: when the delay probability measurement module obtains a cumulative probability $P_{acc,j}$ that is greater than the target probability, determine, on the probability density curve f(x), a node delay value that meets the target probability, and use, as the delay threshold, the node delay value that meets the target probability.

In a fourth implementation disclosed in the second aspect of the present disclosure, the delay measurement apparatus further includes:

a classification module, configured to classify the calculated node delay value of the current packet based on a forwarding priority of the current packet, an ID number of a service flow in which the current packet is located, or a port number of a port through which the current packet is input to the network node device.

In a fifth implementation disclosed in the second aspect of the present disclosure, the delay measurement apparatus further includes:

a preset module, configured to: obtain a basic delay value range of the network node device, a maximum node delay value of the network node device in a congestion case, and a theoretically minimum node delay value; determine a to-be-divided node delay value range based on the theoretically minimum node delay value and the maximum node delay value; divide the to-be-divided node delay value range based on a long-tailed distribution and the basic delay value range, to obtain M delay intervals and M+1 delay boundary values; and configure one delay segment counter for each delay interval.

A delay measurement apparatus disclosed in a third aspect of the present disclosure includes a memory and a processor that communicates with the memory, where the memory is configured to store program code for delay measurement; and the processor is configured to invoke the program code for delay measurement in the memory to perform the delay measurement method disclosed in the first aspect of the present disclosure.

A network node device disclosed in a fourth aspect of the present disclosure includes the delay measurement apparatus disclosed in the second aspect or the third aspect of the present disclosure, where the delay measurement apparatus is disposed inside an egress port or outside the egress port of the network node device.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely the embodiments of the present disclosure, and a person of ordinary skill in the art may still derive other drawings from these accompanying drawings without creative efforts.

DESCRIPTION OF EMBODIMENTS

Full names and explanations of English abbreviations used in specific embodiments of the present disclosure are as follows:

5G: 5th Generation;
TWAMP: Two-Way Active Measurement Protocol;
IP FPM: IP Flow Performance Measurement;
PHY: Physical Layer;
MAC: Media Access Control; and
MIB: Management Information Base.

It can be learned from the background that, for a 5G communications technology, an end-to-end delay measurement technology such as the TWAMP or IP FPM is mainly used in an existing delay measurement manner for a delay-sensitive service. For example, when the TWAMP is used for delay measurement, delay measurement is performed on a path between a transmit end and a receive end by using a constructed measurement packet, to obtain a delay result that reflects an end-to-end full path. For at least one network node device included on a communication link between the transmit end and the receive end, a node delay of the network node device on the communication link cannot be reflected by using the delay result. Therefore, a TWAMP or IP FPM measurement technology cannot quantitatively evaluate and monitor reliability of a network node delay.

The present disclosure provides a delay measurement technical solution of a network node device. A delay measurement apparatus separately performs corresponding delay measurement on a node delay value generated when a packet is transmitted from an ingress port of the network node device to an egress port of the network node device. Serviceability, availability, and reliability of delay performance of the network node device can be evaluated based on obtained delay measurement data. Therefore, precise quantitative evaluation and monitoring of delay reliability of the network node device can be completed based on comprehensive delay measurement data.

The delay measurement apparatus mentioned in the present disclosure may be a physical device or a function module disposed on a physical device. The delay measurement apparatus may be disposed inside the egress port of the network node device, or may be disposed outside the egress port of network node device. The network node device may be a server, a routing device, or a switching device.

Embodiment 1

Figure 1:
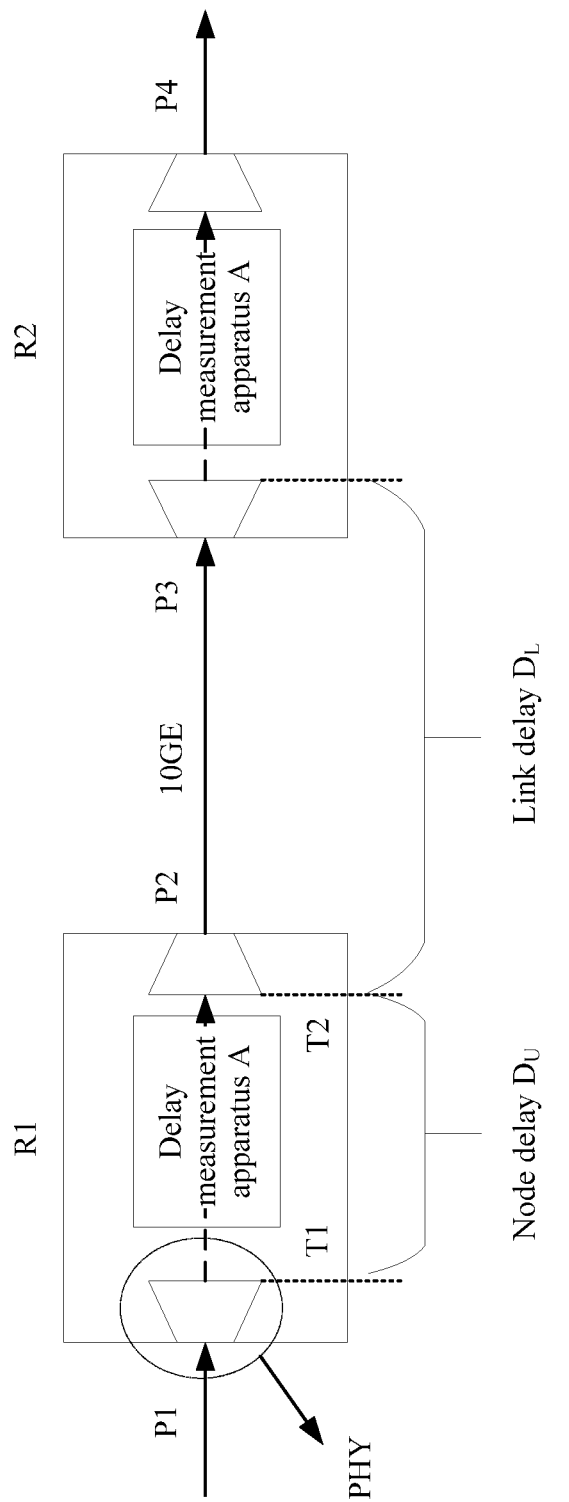
FIG. 1 is a schematic diagram of an application scenario of a delay measurement method according to an embodiment of the present disclosure.

FIG. 1 is a schematic diagram of an application scenario of a delay measurement technical solution of a network node device according to Embodiment 1 of the present disclosure. Two network node devices located between a transmit end and a receive end on a path are used as an example. A network node device R1 and a network node device R2 are included in the application scenario.

An ingress port of the network node device R1 is P1, an egress port of the network node device R1 is P2, and a delay measurement apparatus A is disposed at the egress port P2 of the network node device R1. An ingress port of the network node device R2 is P3, an egress port of the network node device R2 is P4, and a delay measurement apparatus A is disposed at the egress port of the network node device R2. The egress port P2 of the network node device R1 is connected to the ingress port P3 of the network node device R2 by using a communication link.

The communication link that connects the network node device R1 and the network node device R2 and that is disclosed in this embodiment of the present disclosure may be a 10GE communication link, or a 100GE communication link, but is not merely limited thereto.

For packet transmission between the network node device R1 and the network node device R2, when a packet is input from a PHY of the ingress port P1 of the network node device R1, in this case, a timestamp T1 is added to the packet. After being processed by the network node device R1, the packet is output from a PHY of the egress port P2. In this case, a timestamp T2 is added to the packet. A timestamp is a moment at which a packet is correspondingly processed. In the network node device R1, a node delay value $D_{Ui}$ of the packet from the ingress port P1 to the egress port P2 is shown in formula (1):

Node delay value $D_{Ui}$=Timestamp $T2$ of the PHY of the egress port–Timestamp $T1$ of the PHY of the ingress port (1).

The network node device R1 outputs the packet from the PHY of the egress port P2, and inputs the packet from a PHY of the ingress port P3 of the network node device R2 through the communication link. In this case, the network node device R2 adds a timestamp T3 to the packet. After being processed by the network node device R2, the packet is output from a PHY of the egress port P4. In this case, the network node device R2 adds a timestamp T4 to the packet. In the network node device R2, a node delay value $D_{Ui'}$ of the packet from the ingress port P3 to the egress port P4 is shown in formula (2):

Node delay value $D_{Ui'}$=Timestamp $T4$ of the PHY of the egress port–Timestamp $T3$ of the PHY of the ingress port (2).

A link delay generated by the communication link between the network node device R1 and the network node device R2 is $D_L$.

For a measurement process performed for a node delay value of the network node device, a delay measurement apparatus disposed at the egress port P2 of the network node device R1 is used as an example. A specific implementation process of implementing the delay measurement technical solution of the present disclosure by the delay measurement apparatus is described in detail in the following embodiment.

Figure 2A:
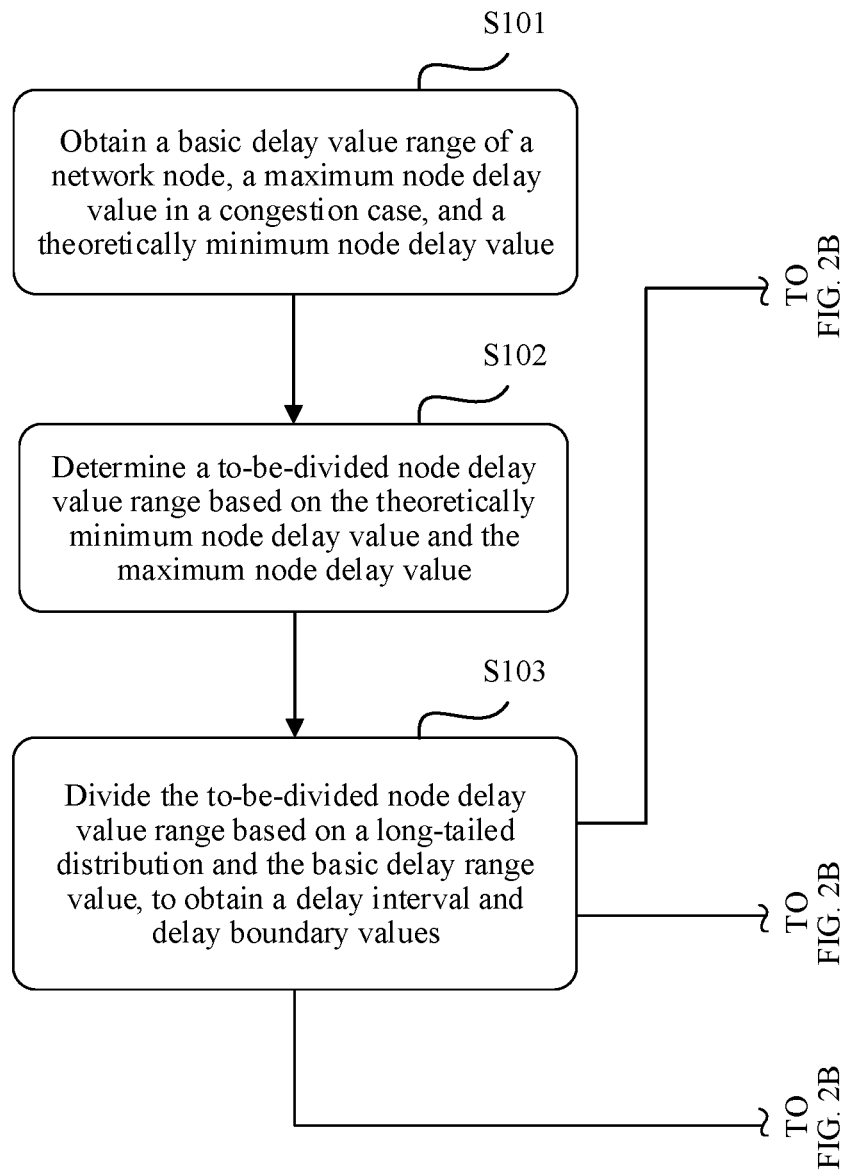
FIG. 2A and FIG. 2B are a schematic flowchart of a delay measurement method according to Embodiment 1 of the present disclosure.
Figure 2B:
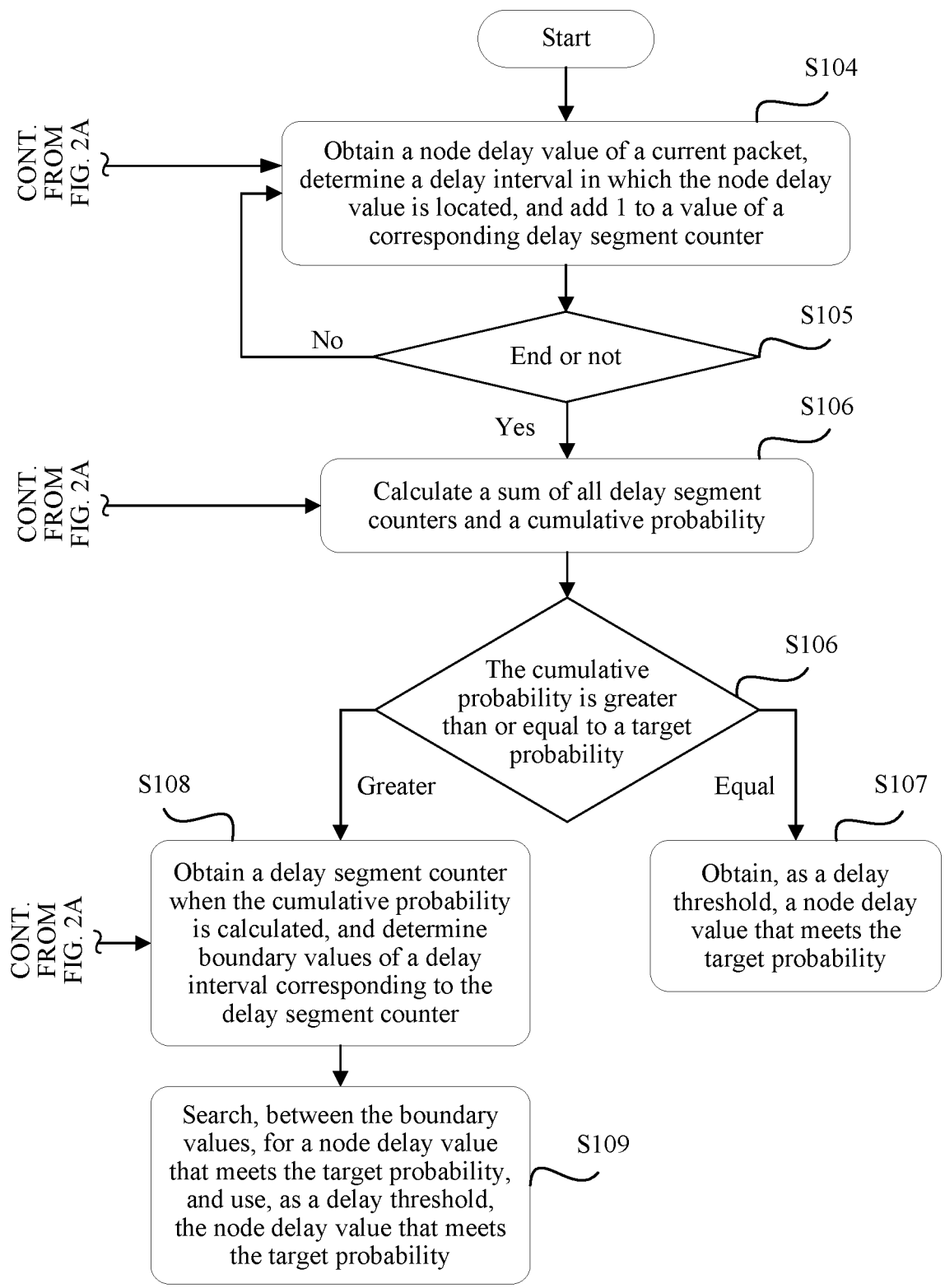

FIG. 2A and FIG. 2B are a schematic flowchart of a delay measurement method of a network node device according to an embodiment of the present disclosure. The delay measurement apparatus first divides a to-be-divided node delay value range, including the following operations.

Operation S101. A delay measurement apparatus obtains a basic delay value range t of a network node device R1, a maximum node delay value $D_{max}$ of the network node device R1 in a congestion case, and a theoretically minimum node delay value $D_{min}$.

The basic delay value range mentioned in S101 is set based on a physical structure of the network node device, and belongs to an inherent delay value range of the network node device. In this embodiment of the present disclosure, an example in which the basic delay value range t of the network node device R1 is from 30 μs (microsecond) to 45 μs is used for description. However, as the network node device is optimized, the inherent delay value range becomes increasingly small.

The maximum node delay value $D_{max}$ mentioned in S101 is a maximum delay value that can be generated when a packet is transmitted in the network node device R1. In this embodiment of the present disclosure, an example in which the maximum node delay value $D_{max}$ of the network node device R1 is 100 ms (millisecond) is used for description.

In S101, in this embodiment of the present disclosure, an example in which theoretically a delay value is not generated in a process of transmitting a packet in the network node device is used, and the theoretically minimum node delay value $D_{min}$ is 0.

Operation S102. The delay measurement apparatus determines a to-be-divided node delay value range T based on the theoretically minimum node delay value $D_{min}$ and the maximum node delay value $D_{max}$.

The theoretically minimum node delay value $D_{min}$ is used as a minimum value of the to-be-divided node delay value range, the maximum node delay value $D_{max}$ is used as a maximum value of the to-be-divided node delay value range, and it is determined that the to-be-divided node delay value range T is from $D_{min}$ to $D_{max}$. The example given in S101 is used. The to-be-divided node delay value range is from 0 ms to 100 ms.

The basic delay value range t is within the to-be-divided node delay value range.

Operation S103. The delay measurement apparatus divides the to-be-divided node delay value range based on a long-tailed distribution and the basic delay value range, to obtain M delay intervals and M+1 delay boundary values, and configures one delay segment counter for each delay interval.

In S103, M>1, and M is a positive integer.

The long-tailed distribution refers to a logarithmic distribution, an exponential distribution, a Poisson distribution, or the like.

In a process of transmitting a packet by using the network node device, a node delay value generated in the network node device usually falls within the basic delay value range.

In this embodiment of the present disclosure, the to-be-divided node delay value range is divided based on a long-tailed distribution manner, and a length of each obtained delay interval is described as follows: A delay interval with a larger probability of occurrence of the node delay value has a shorter length, and a delay interval with a smaller probability of occurrence of the node delay value has a longer length.

Figure 3:
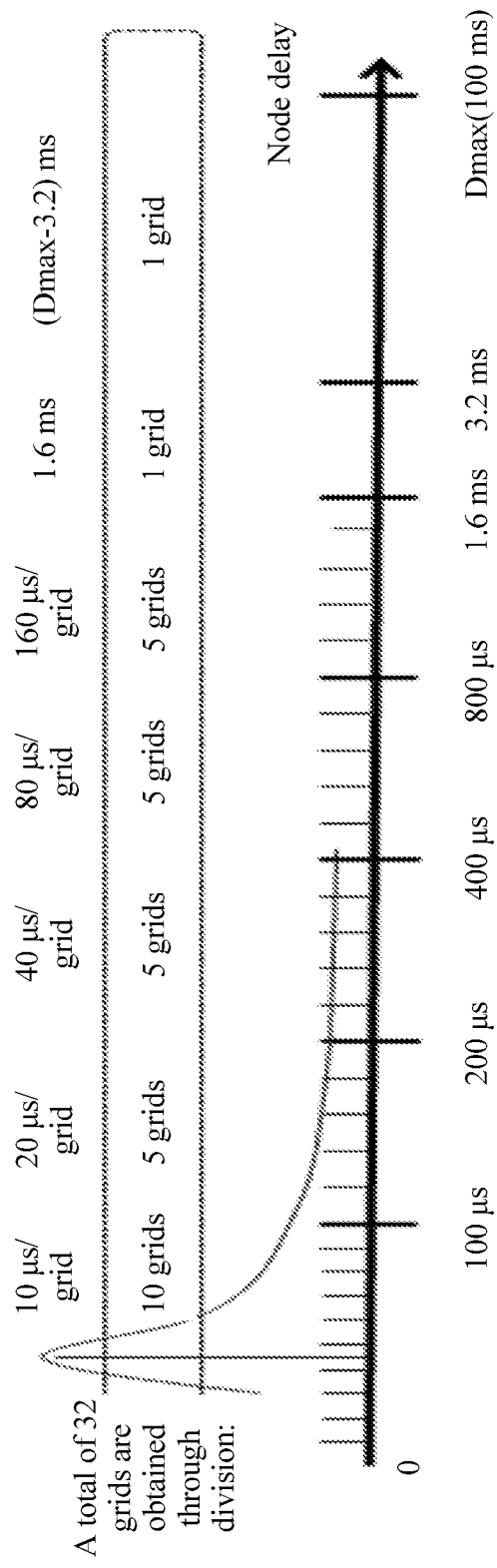
FIG. 3 is a schematic diagram of delay interval division according to Embodiment 1 of the present disclosure.

In most cases, the node delay value falls within the basic delay value range. Therefore, in a process of delay interval division, for a part in which the to-be-divided node delay value range overlaps the basic delay value range, a length of a delay interval obtained through division is shorter, and a length of a divided delay interval that is far away from the overlapping part is longer. As shown in FIG. 3, it is assumed that 0 ms to 100 ms are divided into 32 grids (segments), and 32 delay intervals and 33 boundary values are obtained. Specific division is as follows:

The first delay interval to the tenth delay interval are divided from 0 μs to 100 μs. Each delay interval occupies 10 μs. Obtained boundary values include: $D_0$=0 μs, $D_1$=10 μs, $D_2$=20 μs, . . . , and $D_{10}$=100 μs.

The eleventh delay interval to the fifteenth delay interval are divided from 100 μs to 200 μs. Each delay interval occupies 20 μs. Obtained boundary values include: $D_{11}$=120 μs, $D_{12}$=140 μs, . . . , and $D_{15}$=200 μs.

The sixteenth delay interval to the twentieth delay interval are divided from 200 μs to 400 μs. Each delay interval occupies 40 μs. Obtained boundary values include: $D_{16}$=240 μs, $D_{17}$=280 μs, . . . , and $D_{20}$=400 μs.

The twenty-first delay interval to the twenty-fifth delay interval are divided from 400 μs to 800 μs. Each delay interval occupies 80 μs. Obtained boundary values include: $D_{21}$=480 μs, $D_{22}$=560 μs, . . . , and $D_{25}$=800 μs.

The twenty-sixth delay interval to the thirtieth delay interval are divided from 800 μs to 1.6 ms. Each delay interval occupies 160 μs. Obtained boundary values include: $D_{26}$=960 μs, $D_{27}$=1120 μs=1.12 ms, . . . , and $D_{30}$=1.6 ms.

The thirty-first delay interval is divided from 1.6 ms to 3.2 ms, and occupies 1.6 ms. An obtained boundary value is $D_{31}$=3.2 ms.

The thirty-second delay interval is divided from 3.2 ms to 100 ms, and occupies 96.8 ms. An obtained boundary value is $D_{32}$=100 ms.

One delay segment counter is configured for each delay interval. For example, 32 delay segment counters are configured in total for the foregoing 32 delay intervals obtained through division, and are numbered by using corresponding delay intervals. For example, the first delay interval corresponds to the first delay segment counter, and the second delay interval corresponds to the second delay segment counter. By analogy, the thirty-second delay interval corresponds to the thirty-second delay segment counter.

In the present disclosure, the delay measurement apparatus divides the node delay range in the network node device into a plurality of delay intervals, and configures one delay segment counter for each delay interval. A boundary value of each delay interval may be flexibly configured according to a requirement in a division process, or may be subsequently reconfigured.

As shown in FIG. 2A and FIG. 2B, the delay measurement apparatus performs, based on the M delay intervals and the M+1 boundary values that are obtained in advance, delay distribution measurement and delay probability measurement on a node delay value obtained by the network node device through calculation in a preset time period.

That the delay measurement apparatus performs delay distribution measurement on the obtained node delay value starting from the preset time period includes the following:

Operation S104. Obtain a node delay value of a current packet, determine, based on the M+1 boundary values of the preset M delay intervals, a delay interval in which the node delay value is located, and add 1 to a value of a delay segment counter corresponding to the delay interval.

Operation S105. Determine whether the preset time period ends. If the preset time period does not end, continue to perform S104; or if the preset time period ends, perform delay probability measurement.

In this embodiment of the present disclosure, according to the foregoing example, 32 delay intervals and 33 boundary values are obtained in advance. An example in which the delay measurement apparatus obtains in total 100 node delay values: a node delay value $D_{U1}$ to a node delay value $D_{U100}$ in the preset time period is used to describe S104 and S105.

It is assumed that the node delay value $D_{U1}$ to a node delay value $D_{U20}$ that are obtained through calculation are each 29 μs, a node delay value $D_{U21}$ to a node delay value $D_{U55}$ that are obtained through calculation are each 32 μs, a node delay value $D_{U56}$ that is obtained through calculation is 62 μs, a node delay value $D_{U57}$ that is obtained through calculation is 35 μs, a node delay value $D_{U58}$ that is obtained through calculation is 65 μs, and a node delay value $D_{U59}$ to the node delay value $D_{U100}$ that are obtained through calculation are each 41 μs.

When the preset time period starts, the delay measurement apparatus obtains the node delay value $D_{U1}$ of the current packet, determines, based on the 33 boundary values of the preset 32 delay intervals, that the node delay value $D_{U1}$ is located in the third delay interval, and adds 1 to a value of the third delay segment counter corresponding to the third delay interval.

There are a plurality of manners of determining a delay interval in which the node delay value $D_{U1}$ is located.

For example, the 33 boundary values: the boundary value $D_0$ to the boundary value $D_{32}$ are traversed, and a difference is obtained between each of the 33 boundary values: the boundary value $D_0$ to the boundary value $D_{32}$ and the node delay value $D_{U1}$. If a difference obtained previously is positive, and a difference obtained currently is negative, the node delay value is between the two boundary values. It is assumed that the node delay value $D_{U1}=29$ μs, and a difference is obtained between the node delay value $D_{U1}$ and each of the boundary value $D_0$ to the boundary value $D_{32}$, to obtain $D_{U1}-D_2>0$ and $D_{U1}-D_3<0$. It is determined, based on the obtained differences, that the node delay value $D_{U1}$ is between the boundary value $D_2$ and the boundary value $D_3$. Therefore, it is determined that the node delay value $D_{U1}$ is located in the third delay interval.

In one embodiment, a comparison manner may alternatively be used. For example, if the node delay value $D_{U1}$ is compared with each of the boundary value $D_0$ to the boundary value $D_{32}$ to obtain that the node delay value $D_{U1}$ is greater than the boundary value $D_2$ and less than the boundary value $D_3$, it is determined that the node delay value $D_{U1}$ is between the boundary value $D_2$ and the boundary value $D_3$, and is located in the third delay interval.

It should be noted that, if a node delay value obtained through calculation is the same as a boundary value, the delay measurement apparatus may determine, based on two delay intervals in which the boundary value is located, that the node delay value is located in either of the delay intervals.

By analogy, in a process in which the delay measurement apparatus obtains remaining 99 node delay values: the node delay value $D_{U2}$ to the node delay value $D_{U100}$ in real time, each time the delay measurement apparatus obtains one node delay value, the delay measurement apparatus determines, in a same manner as that of the node delay value $D_{U1}$, a delay interval in which each node delay value is located.

Finally, it is obtained that the node delay value $D_{U1}$ to the node delay value $D_{U20}$ are located in the third delay interval, and a value of the third delay segment counter is 20. The node delay value $D_{U11}$ to the node delay value $D_{U55}$, and the node delay value $D_{U57}$ are located in the fourth delay interval, and a value of the fourth delay segment counter is 36. The node delay value $D_{U56}$ to the node delay value $D_{U58}$ are located in the sixth delay interval, and a value of the sixth delay segment counter is 2. The node delay value $D_{U59}$ to the node delay value $D_{U100}$ are located in the fifth delay interval, and a value of the fifth delay segment counter is 42.

A sum of values of all delay segment counters is equal to a quantity of node delay values received in the preset time period.

In one embodiment, after the delay interval in which the node delay value is located is determined, and the value of the corresponding delay segment counter is added by 1, the node delay value may be discarded.

As shown in FIG. 2A and FIG. 2B, the delay measurement apparatus performs delay probability measurement based on values that are of delay segment counters and that are obtained by performing delay distribution measurement.

Operation S106. The delay measurement apparatus calculates a sum $C_{total}$ of values of M delay segment counters in the preset time period, calculates a cumulative probability $P_{acc,j}$ according to formula (3), and compares, with a target probability, the cumulative probability $P_{acc,j}$ obtained based on values that are of delay segment counters and that are accumulated each time. If a cumulative probability $P_{acc,j}$ that is less than the target probability is obtained, continue to accumulate and calculate the values of the delay segment counters. If a cumulative probability $P_{acc,j}$ that is equal to the target probability is obtained, perform S107. If a cumulative probability $P_{acc,j}$ that is greater than the target probability is obtained, perform S108.

$$P_{acc,j}=C_{acc,j}/C_{total} \quad (3)$$

$C_{acc,j}$ is a sum obtained by accumulating from a value of the first delay segment counter to a value of a $j^{th}$ delay segment counter, $1 \leq j \leq M$, and j is a positive integer. $C_{total}$ is the sum of the values of the M delay segment counters in the preset time period.

In a process of calculating the sum of the values of the M delay segment counters, after the values of the M delay segment counters are obtained, one addition operation may be performed to obtain the sum $C_{total}$ of the values of the M delay segment counters in the preset time period.

Alternatively, after S104 is performed once, one delay segment counter may be obtained to perform a counting operation, and 1 is accumulated once until the preset time period ends, to obtain the sum $C_{total}$ of the accumulated values of the M delay segment counters.

In formula (3), $C_{acc,j}$ is a variable. In a process of calculating the cumulative probability $P_{acc,j}$, $C_{acc,j}$ is the sum obtained by accumulating from the value of the first delay segment counter to the value of the $j^{th}$ delay segment counter.

The target probability is a preset probability, may be set by a technician, and may be 99%, 99.5%, or 99.999%. This is not limited in the present disclosure.

Operation S107. When obtaining a cumulative probability $P_{acc,j}$ that is equal to the target probability, the delay measurement apparatus obtains, as a delay threshold, a node delay value that meets the target probability.

Based on the foregoing example, the 32 delay intervals and the 33 boundary values that are obtained in advance are used as an example. It is assumed that the delay measurement apparatus obtains in total 900 node delay values: a node delay value $D_j$ to a node delay value $D_{900}$ in the preset time period. In a process of performing delay distribution measurement by the delay measurement apparatus, each delay segment counter performs a corresponding operation of adding 1 based on delay intervals in which the node delay value $D_j$ to the node delay value $D_{900}$ are located. After the preset time period ends, the delay measurement apparatus obtains that a value of the third delay segment counter is 120, a value of the fourth delay segment counter is 436, a value of the fifth delay segment counter is 340, a value of the sixth delay segment counter is 1, a value of the ninth delay segment counter is 1, and a sum of values of all delay segment counters is 900.

It is assumed that the target probability is 99.5%. When the value of the third delay segment counter is accumulated, a cumulative probability $P_{acc.3}=120/900=13.3\%$ is obtained according to formula (3), and the cumulative probability $P_{acc.3}$ is less than less the target probability. Therefore, the value of the fourth delay segment counter continues to be accumulated.

When the value of the fourth delay segment counter is accumulated, a cumulative probability $P_{acc.4}=556/900=61.8\%$ is obtained according to formula (3), and the cumulative probability $P_{acc.4}$ is less than the target probability. Therefore, a value of a delay segment counter continues to be accumulated.

When the value of the fifth delay segment counter is accumulated, a cumulative probability $P_{acc.5}=896/900=99.5\%$ is obtained according to formula (3), and the cumulative probability $P_{acc.5}$ is equal to the target probability. Therefore, the delay measurement apparatus determines a node delay value corresponding to the target probability as the delay threshold.

Operation S108. When obtaining a cumulative probability $P_{acc.j}$ that is greater than the target probability, the delay measurement apparatus obtains a $j^{th}$ delay segment counter when calculating the cumulative probability $P_{acc.j}$, and determines boundary values $D_{j-1}$ and $D_j$ of a delay interval corresponding to the $j^{th}$ delay segment counter.

Operation S109. The delay measurement apparatus searches, between the boundary value and the boundary value $D_j$, for a node delay value that meets the target probability, and uses, as a delay threshold, the node delay value that meets the target probability.

In this embodiment of the present disclosure, the 32 delay intervals and the 33 boundary values that are obtained in advance are used as an example. It is assumed that the delay measurement apparatus obtains in total 1000 node delay values: a node delay value $D_j$ to a node delay value $D_{1000}$ in the preset time period. In a process of performing delay distribution measurement by the delay measurement apparatus, each delay segment counter performs a corresponding operation of adding 1 based on delay intervals in which the node delay value $D_j$ to the node delay value $D_{1000}$ are located. After the preset time period ends, the delay measurement apparatus obtains that a value of the fourth delay segment counter is 652, a value of the fifth delay segment counter is 346, a value of the ninth delay segment counter is 2, and a sum of values of all delay segment counters is 1000.

It is assumed that the target probability is 99.5%. When the value of the fourth delay segment counter is accumulated, a cumulative probability $P_{acc.4}=652/1000=65.2\%$ is obtained according to formula (3), and the cumulative probability $P_{acc.4}$ is less than less the target probability. Therefore, the value of the fifth delay segment counter continues to be accumulated.

When the value of the fifth delay segment counter is accumulated, a cumulative probability $P_{acc.5}=998/1000=99.8\%$ is obtained according to formula (3), and the cumulative probability $P_{acc.5}$ is greater than the target probability. Therefore, it is obtained that $C_{acc.j}$ is is accumulated to the fifth delay segment counter when the cumulative probability is calculated.

The delay measurement apparatus determines the fifth delay interval corresponding to the fifth delay segment counter. The delay measurement apparatus determines a boundary value $D_4$ and a boundary value $D_5$ of the fifth delay interval, searches, between the boundary value $D_4$ and the boundary value $D_5$, for a node delay value that meets the target probability, and uses, as the delay threshold, the node delay value that meets the target probability.

In this embodiment of the present disclosure, optionally, a value that is of each delay segment counter and that is obtained by performing delay distribution measurement by the delay measurement apparatus, and the cumulative probability and the delay threshold that are obtained by performing delay probability measurement are stored in a unified format. For example, when the delay measurement apparatus includes an MIB, the value of each delay segment counter, the cumulative probability, and the delay threshold are stored in the MIB in an MIB format.

According to the delay measurement method disclosed in Embodiment 1 of the present disclosure, delay distribution measurement and delay probability measurement are separately performed on the node delay value received in the preset time period, and serviceability, availability, and reliability of delay performance of the network node device are evaluated based on obtained delay measurement data. Further, delay measurement data that is provided in an entire network when each network node device forwards a packet is obtained. Precise quantitative evaluation and monitoring of serviceability, availability, and reliability of a network node delay can be completed based on obtained comprehensive delay measurement data.

Embodiment 2

Figure 4A:
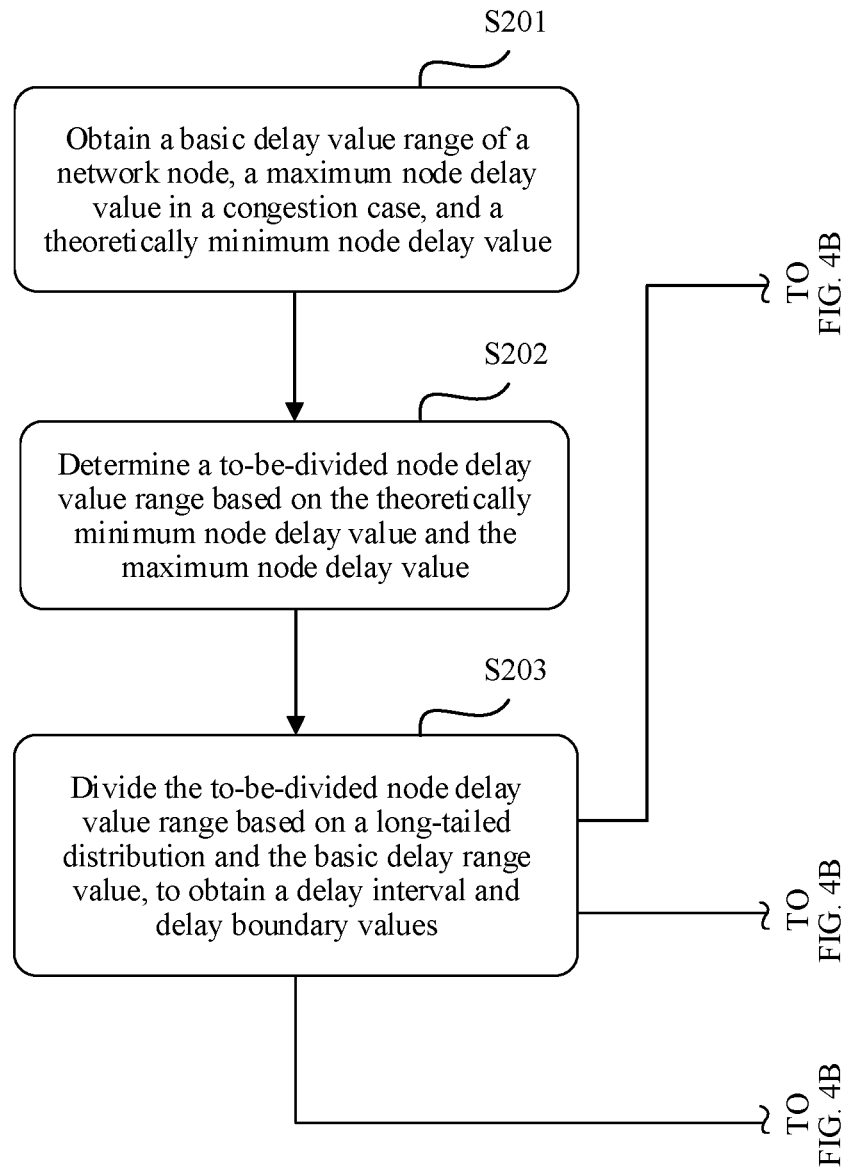
FIG. 4A, FIG. 4B, and FIG. 4C are a schematic flowchart of a delay measurement method according to Embodiment 2 of the present disclosure.
Figure 4B:
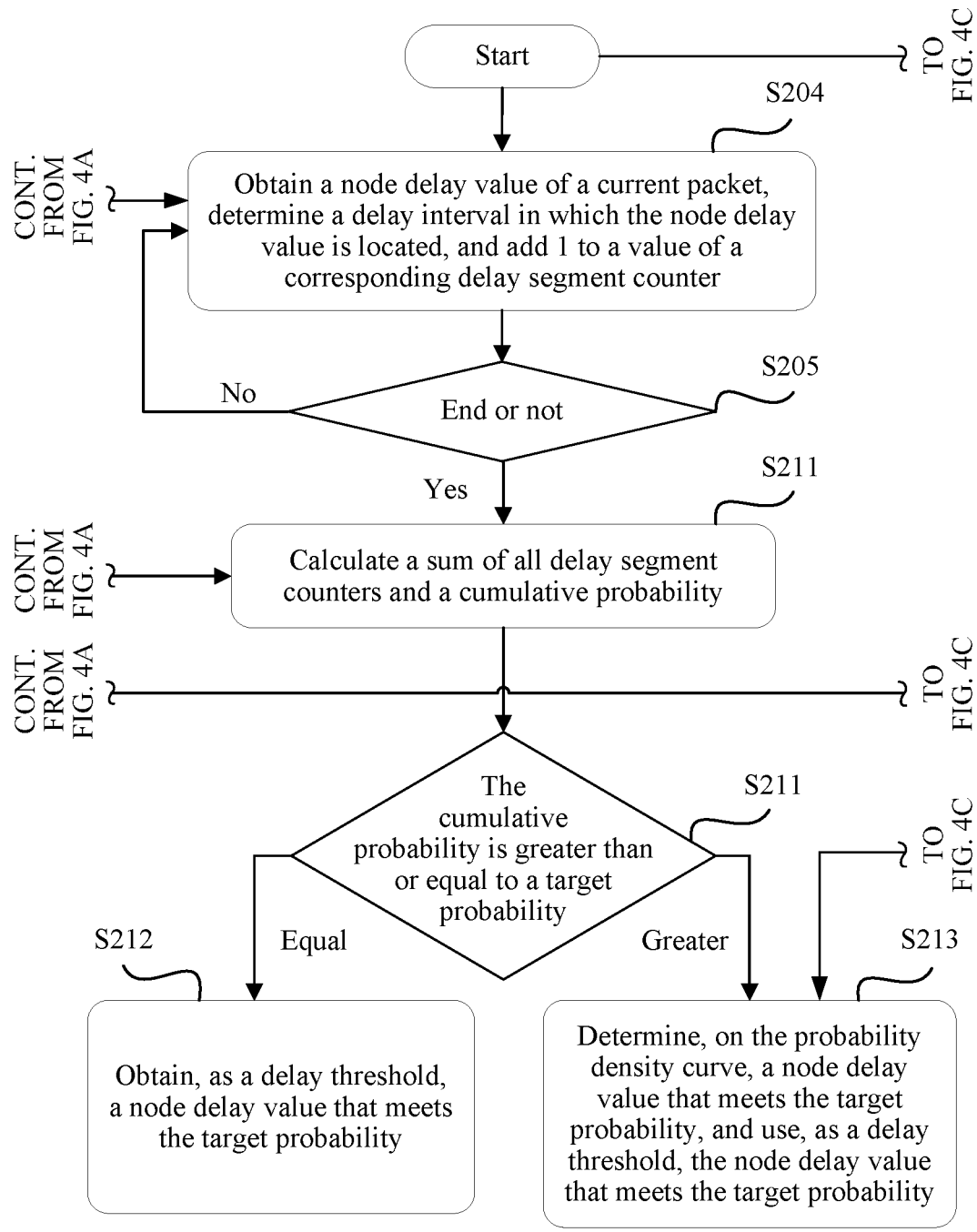
Figure 4C:
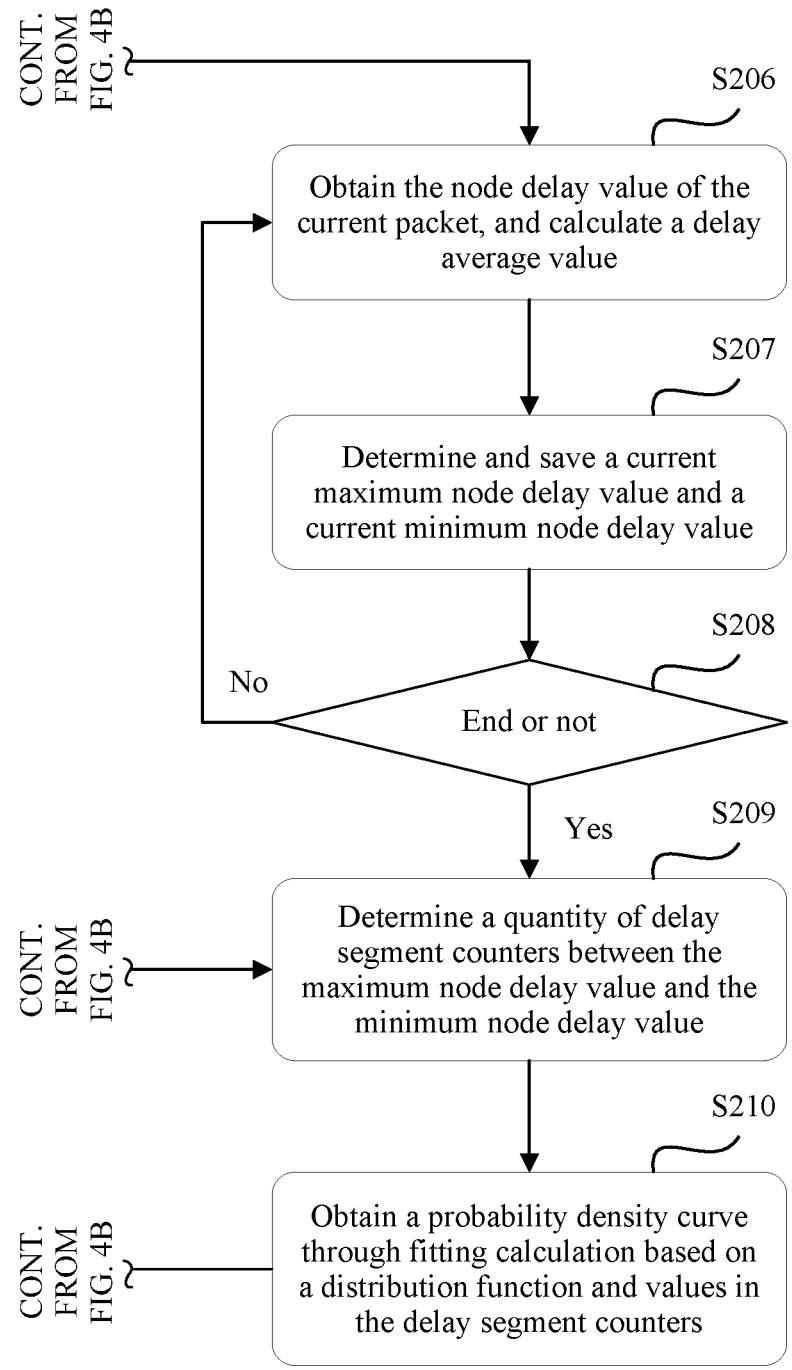

Based on the application scenario shown in FIG. 1, Embodiment 2 of the present disclosure further discloses a delay measurement method of a network node device, and a flowchart of the delay measurement method is shown in FIG. 4A, FIG. 4B, and FIG. 4C. A delay measurement apparatus first divides a to-be-divided node delay value range, including the following operations.

Operation S201. A delay measurement apparatus obtains a basic delay value range t of a network node device R1, a maximum node delay value $D_{max}$ of the network node device R1 in a congestion case, and a theoretically minimum node delay value $D_{min}$.

Operation S202. The delay measurement apparatus determines a to-be-divided node delay value range T based on the theoretically minimum node delay value $D_{min}$ and the maximum node delay value $D_{max}$.

Operation S203. The delay measurement apparatus divides the to-be-divided node delay value range based on a long-tailed distribution and the basic delay value range, to obtain M delay intervals and M+1 delay boundary values, and configures one delay segment counter for each delay interval.

In Embodiment 2 of the present disclosure, a principle and a process based on which the delay measurement apparatus performs S201 to S203 are the same as those of S101 to S103 in Embodiment 1 of the present disclosure. For specific content, refer to S101 to S103 in Embodiment 1 of the present disclosure. Details are not described herein again.

In Embodiment 2 of the present disclosure, delay measurement performed by the delay measurement apparatus on a node delay value of the network node device includes delay distribution measurement, delay feature measurement, and delay probability measurement.

As shown in FIG. 4A, FIG. 4B, and FIG. 4C, that the delay measurement apparatus performs delay distribution measurement on an obtained node delay value starting from a preset time period includes the following:

Operation S204. Obtain a node delay value of a current packet, determine, based on the M+1 boundary values of the preset M delay intervals, a delay interval in which the node delay value is located, and add 1 to a value of a delay segment counter corresponding to the delay interval.

Operation S205. Determine whether the preset time period ends. If the preset time period does not end, continue to perform S204; or if the preset time period ends, perform delay probability measurement.

In Embodiment 2 of the present disclosure, a principle and a process based on which the delay measurement apparatus performs S204 and S205 are the same as those of S104 and S105 in Embodiment 1 of the present disclosure. For specific content, refer to S104 and S105 in Embodiment 1 of the present disclosure. Details are not described herein again.

A difference between Embodiment 2 of the present disclosure and Embodiment 1 lies in that delay feature measurement is further added before the delay measurement apparatus performs delay probability measurement. In one embodiment, the delay measurement apparatus may simultaneously perform delay distribution measurement and delay feature measurement.

As shown in FIG. 4A, FIG. 4B, and FIG. 4C, that the delay measurement apparatus performs delay feature measurement on the obtained node delay value starting from the preset time period includes the following:

Operation S206. The delay measurement apparatus obtains the node delay value of the current packet, and calculates an average delay value according to formula (4):

$$D_{av.Ui} = (D_{av.Ui-1}) * [(i-1)/i] + (D_{Ui})/i \qquad (4),\text{ where}$$

i indicates a sum of currently obtained node delay values, a value of i is from 1 to N, and N indicates a maximum quantity of node delay values that are obtained by the delay measurement apparatus in the preset time period. For example, in the preset time period, if the delay measurement apparatus receives 100 node delay values, N is 100, and the value of i is from 1 to 100.

$D_{Ui}$ indicates a currently obtained $i^{th}$ node delay value. $D_{av.Ui}$ indicates an average delay value of currently obtained i node delay values. $D_{av.Ui-1}$ indicates an average delay value of the obtained first i−1 node delay values.

The current average delay value is calculated based on formula (4), and there is no need to calculate an average value after all node delay values are obtained. This is very practical and occupies only a few resources.

Operation S207. The delay measurement apparatus determines a maximum node delay value and a minimum node delay value in currently obtained node delay values, and saves the maximum node delay value and the minimum node delay value.

Each time one node delay value is obtained, the node delay value is separately compared with a maximum node delay value that is previously determined and stored in a maximum delay register and a minimum node delay value that is stored in a minimum delay register. If the currently obtained node delay value is greater than the maximum node delay value, the original maximum node delay value is replaced with the currently obtained node delay value, and the currently obtained node delay value is stored in the maximum delay register as a new maximum node delay value. If the currently obtained node delay value is less than the minimum node delay value, the original minimum node delay value is replaced with the currently obtained node delay value, and the currently obtained node delay value is stored in the minimum delay register as a new minimum node delay value.

Operation S208. The delay measurement apparatus determines whether the preset time period ends; and if the preset time period does not end, returns and continues to perform S206; or if the preset time period ends, determines a final maximum node delay value and a final minimum node delay value, and performs S209.

An example in which the delay measurement apparatus obtains in total 100 node delay values: a node delay value $D_{U1}$ to a node delay value $D_{U100}$ in the preset time period is used to describe S206 to S208.

It is assumed that the node delay value $D_{U1}$ to a node delay value $D_{U20}$ that are obtained through calculation are each 29 μs, a node delay value $D_{U21}$ to a node delay value $D_{U55}$ that are obtained through calculation are each 32 μs, a node delay value $D_{U56}$ that is obtained through calculation is 62 μs, a node delay value $D_{U57}$ that is obtained through calculation is 35 μs, a node delay value $D_{U58}$ that is obtained through calculation is 65 μs, and a node delay value $D_{U59}$ to the node delay value $D_{U100}$ that are obtained through calculation are each 41 μs.

When the first node delay value $D_{U1}$ is obtained, $D_{av.U1} = D_{U1}/1 = 29$ μs is obtained according to formula (4).

In this case, there is only one node delay value $D_{U1}$. Therefore, the node delay value $D_{U1}$ is stored in the maximum delay register as a current maximum node delay value, and the node delay value $D_{U1}$ is also stored in the minimum delay register as a current minimum node delay value.

Because the preset time period does not end, the second node delay value $D_{U2}$ continues to be obtained, and $D_{av.U2} = D_{av.U1} * (1/2) + D_{U2}/2 = 29$ μs is obtained according to formula (4).

In this case, the node delay value $D_{U2}$ is compared with the node delay value $D_{U1}$ stored in the maximum delay register, and it is determined that the two values are the same, and no replacement is performed. The node delay value $D_{U2}$ is compared with the node delay value $D_{U1}$ stored in the minimum delay register, and it is determined that the two values are the same, and no replacement is performed.

By analogy, when the twenty-first node delay value $D_{U21}$ is obtained, $D_{av.U21} = D_{av.U20} * (20/21) + D_{U21}/21 = 29.1$ μs is obtained according to formula (4).

In this case, the node delay value $D_{U21}$ is compared with the node delay value $D_{U1}$ stored in the maximum delay register. Because the node delay value $D_{U21}$ is 32 μs, and the node delay value $D_{U1}$ is 29 μs, it is determined that the node delay value $D_{U21}$ is greater than the node delay value $D_{U1}$. Then, the node delay value $D_{U21}$ is used to replace the node delay value $D_{U1}$, and the node delay value $D_{U21}$ is stored in the maximum delay register. The node delay value $D_{U1}$ is still stored in the minimum delay register.

By analogy, when the last node delay value $D_{U100}$ in the preset time period is obtained, $D_{av.U100} = D_{av.U99} * 99/100 + D_{U100}/100 = 44$ μs is obtained according to formula (4).

In this case, the maximum node delay value stored in the maximum delay register is the node delay value $D_{U58}$, and the minimum node delay value stored in the minimum delay register is the node delay value $D_{U1}$.

In one embodiment, after obtaining all node delay values in the preset time period, the delay measurement apparatus may alternatively make a comparison, or obtain a difference between each two of the node delay values, to determine the maximum node delay value and the minimum node delay value in the preset time period.

Operation S209. The delay measurement apparatus determines, based on the preset M delay intervals, a delay interval between the maximum node delay value and the minimum node delay value, and obtains a quantity of valid delay segment counters corresponding to the delay interval, where the valid delay segment counters are delay segment counters that perform counting in the preset time period.

The M delay intervals are not evenly divided, and a subsequent fitted curve is relatively complicated by using values in delay segment counters corresponding to all delay intervals. Therefore, optionally, a value in a delay segment counter corresponding to the delay interval between the maximum node delay value and the minimum node delay value may be selected to construct the subsequent fitted curve.

Operation S210. The delay measurement apparatus obtains a probability density curve f(x) through fitting calculation based on a distribution function and values of a determined quantity of valid delay segment counters.

The distribution function herein includes a distribution function such as a normal distribution function, a lognormal distribution function, a Gamma distribution function, a Weibull function, an exponential distribution function, or a Poisson distribution function.

The probability density curve f(x) is obtained through fitting calculation based on the values in the determined valid delay segment counters and the distribution function. In the probability density curve f(x) obtained through fitting calculation, x is a random variable, and varies with the values of the determined quantity of valid delay segment counters. A larger value in a valid delay segment counter corresponds to a larger peak value in the probability density curve f(x). The probability density curve f(x) is used for subsequent delay probability measurement.

In one embodiment, the probability density curve f(x) may be obtained through fitting calculation by using a distribution function. Probability density curves may be alternatively obtained separately through fitting calculation by using a plurality of distribution functions. Then, the probability density curves obtained by separately fitting the plurality of distribution functions are evaluated by using a sum of squared errors (SSE) and an R-square index, so as to determine a probability density curve closest to an actual delay distribution case, and use the probability density curve as the probability density curve f(x) for subsequent delay probability measurement.

In one embodiment, after the delay interval between the maximum node delay value and the minimum node delay value is determined, the obtained delay interval may be re-divided by using a preset minimum granularity, so that delay intervals obtained through re-division are evenly divided. In addition, the delay segment counter corresponding to the original delay interval is also re-divided based on the divided delay intervals.

For example, the preset minimum granularity is 10 μs. There are three delay intervals between the maximum node delay value and the minimum node delay value: the third delay interval, the fourth delay interval, and the fifth delay interval respectively. Delay lengths occupied by the delay intervals are respectively as follows: The third delay interval occupies 10 μs, the fourth delay interval occupies 20 μs, and the fifth delay interval occupies 30 μs. Delay segment counters corresponding to the delay intervals are respectively as follows: A value of the third delay segment counter is 15, a value of the fourth delay segment counter is 30, and a value of the fifth delay segment counter is 15.

Figure 5:
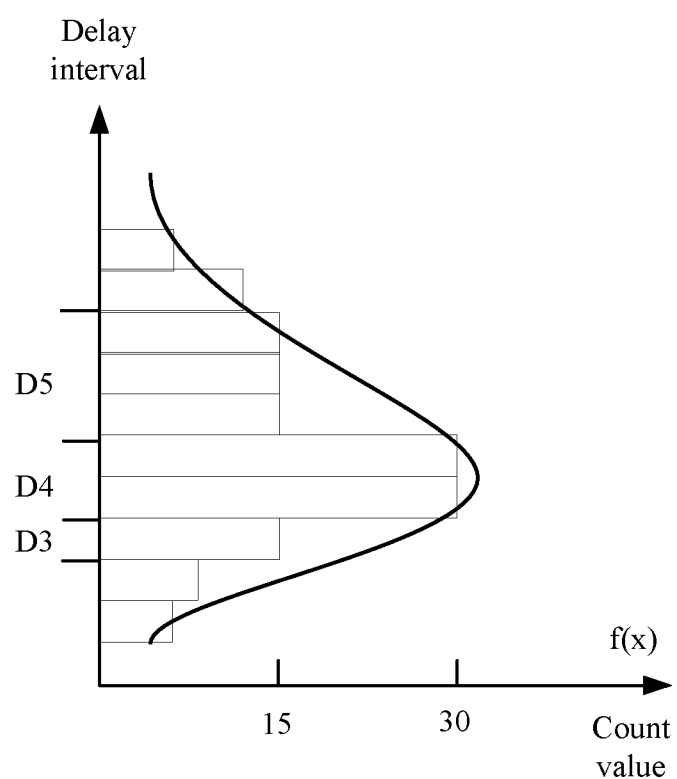
FIG. 5 is a schematic diagram of a probability density curve f(x) according to Embodiment 2 of the present disclosure.

The third delay interval, the fourth delay interval, and the fifth delay interval are re-divided based on the preset minimum granularity. The third delay interval is not changed, the fourth delay interval is divided into two delay intervals, the fifth delay interval is divided into three delay intervals, and a total of six delay intervals are obtained. Based on the foregoing division, a value of the delay segment counter corresponding to the original delay interval is also divided, and values of delay segment counters corresponding to the six delay intervals are successively: 15, 30, 30, 15, 15, and 15. FIG. 5 is a probability density curve f(x) fitted by using this example as an example. In the figure, D3 indicates the third delay interval, D4 indicates the fourth delay interval, and D5 indicates the fifth delay interval.

Fitting calculation is performed by using the delay interval determined through even division and a value of a delay segment counter corresponding to each re-divided delay interval, and an obtained probability density curve f(x) is more precise.

As shown in FIG. 4A, FIG. 4B, and FIG. 4C, after performing delay distribution measurement to obtain the value of the delay segment counter corresponding to each delay interval, and performing delay feature measurement to obtain the average delay value and the probability density curve f(x), the delay measurement apparatus performs delay probability measurement based on a result obtained through delay distribution measurement and a result obtained through delay feature measurement.

Operation S211. The delay measurement apparatus calculates a sum $C_{total}$ of values of M delay segment counters in the preset time period, calculates a cumulative probability $P_{acc,j}$ according to formula (3), and compares, with a target probability, the cumulative probability $P_{acc,j}$ obtained based on values that are of delay segment counters and that are accumulated each time. If a cumulative probability $P_{acc,j}$ that is less than the target probability is obtained, continue to accumulate and calculate the values of the delay segment counters. If a cumulative probability $P_{acc,j}$ that is equal to the target probability is obtained, perform S212. If a cumulative probability $P_{acc,j}$ that is greater than the target probability is obtained, perform S213.

In Embodiment 2 of the present disclosure, an execution process and a principle of S211 are the same as those of S106 in Embodiment 1 of the present disclosure. For specific content, refer to S106. Details are not described herein again.

Operation S212. When obtaining a cumulative probability $P_{acc,j}$ that is equal to the target probability, the delay measurement apparatus obtains, as a delay threshold, a corresponding node delay value that meets the target probability.

In Embodiment 2 of the present disclosure, an execution process and a principle of S212 are the same as those of S107 in Embodiment 1 of the present disclosure. For specific content, refer to S107. Details are not described herein again.

Operation S213. When obtaining a cumulative probability $P_{acc,j}$ that is greater than the target probability, the delay measurement apparatus determines, on the probability density curve f(x), a node delay value that meets the target probability, and use, as a delay threshold, the node delay value that meets the target probability.

In this embodiment of the present disclosure, 32 delay intervals and 33 boundary values that are obtained in advance are used as an example. It is assumed that the delay measurement apparatus obtains in total 1000 node delay values: a node delay value $D_j$ to a node delay value $D_{1000}$ in the preset time period. In a process of performing delay distribution measurement by the delay measurement apparatus, each delay segment counter performs a corresponding operation of adding 1 based on delay intervals in which the node delay value $D_j$ to the node delay value $D_{1000}$ are located. After the preset time period ends, the delay measurement apparatus obtains that a value of the fourth delay segment counter is 652, a value of the fifth delay segment counter is 346, a value of a ninth delay segment counter is 2, and a sum of values of all delay segment counters is 1000.

It is assumed that the target probability is 99.5%. When the value of the fourth delay segment counter is accumulated, a cumulative probability $P_{acc.4}=652/1000=65.2\%$ is obtained according to formula (3), and the cumulative probability $P_{acc.4}$ is less than the target probability. Therefore, the value of the fifth delay segment counter continues to be accumulated.

When the value of the fifth delay segment counter is accumulated, a cumulative probability $P_{acc.5}=998/1000=99.8\%$ is obtained according to formula (3), and the cumulative probability $P_{acc.5}$ is greater than the target probability. Therefore, it is obtained that $C_{acc.j}$ is accumulated to the fifth delay segment counter when the cumulative probability is calculated.

The delay measurement apparatus determines the fifth delay interval corresponding to the fifth delay segment counter, and determines a line segment that is on the probability density curve f(x) and that is corresponding to the fifth delay interval. The delay measurement apparatus calculates a slope of the line segment, determines, in a step-by-step integration manner based on an area formed by the line segment and the X-axis, the node delay value that meets the target probability, and uses, as the delay threshold, the node delay value that meets the target probability.

In one embodiment, the delay measurement apparatus may alternatively calculate a delay value in a specified probability distribution based on the probability density curve f(x), for example, calculate a node delay value in a case of a probability distribution 20%, or calculate a node delay value in a case of a probability distribution 99%.

In one embodiment, the delay measurement apparatus may alternatively obtain, based on the probability density curve f(x), a node delay value corresponding to the average delay value, and measure delay performance of the network node device by using the node delay value corresponding to the average delay value.

In this embodiment of the present disclosure, optionally, a value that is of each delay segment counter and that is obtained by performing delay distribution measurement by the delay measurement apparatus, the maximum node delay value, the minimum node delay value, and the average delay value that are obtained by performing delay feature measurement, and the cumulative probability and the delay threshold that are obtained by performing delay probability measurement are stored in a unified format. For example, when the delay measurement apparatus includes an MIB, results obtained by performing delay distribution measurement, delay feature measurement, and delay probability measurement are stored in an MIB format.

According to the delay measurement method disclosed in Embodiment 2 of the present disclosure, delay distribution measurement, delay feature measurement, and delay probability measurement are separately performed on the node delay value received in the preset time period, and serviceability, availability, and reliability of delay performance of the network node device are evaluated based on delay measurement data. Further, delay measurement data that is of each network node device and that is provided in an entire network is obtained. Precise quantitative evaluation and monitoring of serviceability, availability, and reliability of a network node delay can be completed based on obtained comprehensive delay measurement data.

In one embodiment, based on the delay measurement methods disclosed in Embodiment 1 and Embodiment 2 of the present disclosure, in a process of performing delay measurement, a link delay between network node devices may be further collected, for example, a link delay value $D_L$ between a network node device R1 and a network node device R2 shown in FIG. 1. In one embodiment, when the network node devices are connected by using an optical fiber, a link delay generated when a packet is transmitted through the optical fiber is a fixed latency.

Further, better quantitative evaluation and monitoring of the serviceability, the availability, and the reliability of the network node delay can be completed after the link delay value between the network node devices and a node delay value of each network node are obtained and combined.

In one embodiment, based on the delay measurement methods disclosed in Embodiment 1 and Embodiment 2 of the present disclosure, when the preset time period starts, the node delay value obtained through calculation may be first classified, and the node delay value obtained through calculation is measured based on a classification in the delay measurement apparatus. Alternatively, a node delay value corresponding to a particular type in the classification may be measured according to a user requirement.

The node delay value is generated when a packet is transmitted from an ingress port of the network node device to an egress port of the network node device. The packet further carries port number information when being input to the network node device, a forwarding priority of the packet, or an ID number of a service flow in which the packet is located. The port number information of the network node device indicates a number of each port on the network node device. The forwarding priority of the packet indicates a priority classified according to importance of the packet. For example, forwarding priorities of packets may be classified in ascending order into 0 to 7, a total of eight levels. The ID number of the service flow in which the packet is located indicates a number of the service flow.

For example, classification is performed according to the port number information when the packet is input to the network node device, and a current delay measurement apparatus processes only a node delay value that is generated by a packet input from a second port. If the network node device receives a packet input from a first port, and obtains a node delay value of the packet in the network node device through calculation, the delay measurement apparatus does not measure the node delay value because the delay measurement apparatus processes only the node delay value that is generated by the packet input from the second port. If the node delay value is the node delay value that is generated by the packet input from the second port, the delay measurement apparatus measures the node delay value.

For example, classification is performed according to the forwarding priority of the packet, and a current delay measurement apparatus processes only a node delay value that is generated by a packet whose forwarding priority is 7. If the network node device receives a packet whose forwarding priority is 5, and obtains a node delay value of the packet in the network node device through calculation, the delay measurement apparatus does not measure the node delay value because the delay measurement apparatus processes only the node delay value that is generated by the packet whose forwarding priority is 7. If the node delay value is the node delay value that is generated by the packet whose forwarding priority is 7, the delay measurement apparatus measures the node delay value.

Further, the delay measurement apparatus may perform category-based measurement on the node delay value of the network node according to different application requirements. With category-based measurement on the node delay value, a node delay value that meets a corresponding application requirement may be collected more pertinently, so that in a process of precisely evaluating and monitoring the serviceability, the availability, and the reliability of the network node delay, pertinence can be improved, and power consumption can be reduced.

Based on the foregoing delay measurement technical solutions disclosed in Embodiment 1 and Embodiment 2 of the present disclosure, the present disclosure further discloses a corresponding delay measurement apparatus.

Figure 6:
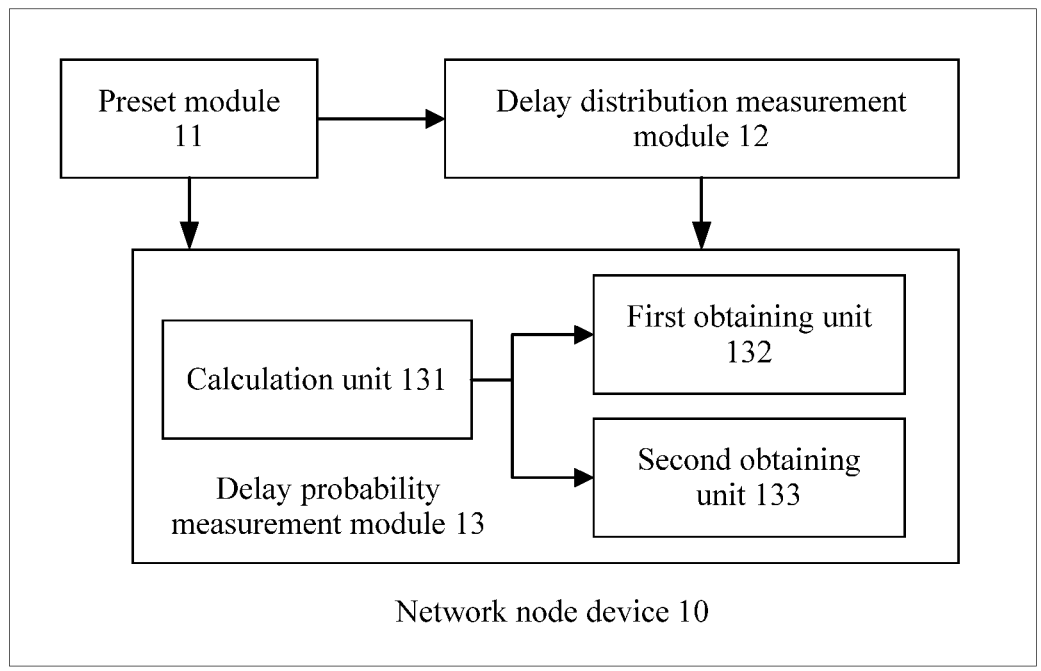
FIG. 6 is a schematic structural diagram of a delay measurement apparatus according to the present disclosure.

FIG. 6 is a schematic structural diagram of a delay measurement apparatus according to the present disclosure. The delay measurement apparatus 10 includes a preset module 11, a delay distribution measurement module 12, and a delay probability measurement module 13.

The preset module 11 is configured to: obtain a basic delay value range of a network node device, a maximum node delay value of the network node device in a congestion case, and a theoretically minimum node delay value; determine a to-be-divided node delay value range based on the theoretically minimum node delay value and the maximum node delay value; divide the to-be-divided node delay value range based on a long-tailed distribution and the basic delay value range, to obtain M delay intervals and M+1 delay boundary values; and configure one delay segment counter for each delay interval.

The delay distribution measurement module 12 is configured to: obtain a node delay value of a current packet when a preset time period starts, where the node delay value is used to indicate a delay generated when the current packet is forwarded from an ingress port of the network node device to an egress port of the network node device; determine, based on the M+1 boundary values of the preset M delay intervals, a delay interval in which the node delay value is located, and add 1 to a value of a delay segment counter corresponding to the delay interval in which the node delay value is located, where M>1, M is a positive integer, the delay interval in which the node delay value is located belongs to the M delay intervals, and each delay interval corresponds to one delay segment counter; return and obtain a node delay value of a next packet until the preset time period ends; and send a value of each delay segment counter to the delay probability measurement module 13.

The delay probability measurement module 13 includes a calculation unit 131, a first obtaining unit 132, and a second obtaining unit 133.

The calculation unit 131 is configured to calculate a cumulative probability $P_{acc.j}$. For a process of calculating the cumulative probability $P_{acc.j}$, refer to formula (3).

The first obtaining unit 132 is configured to: when it is determined that a cumulative probability $P_{acc.j}$ that is equal to a target probability is obtained, obtain, as a delay threshold, a node delay value that meets the target probability.

The second obtaining unit 133 is configured to: when it is determined that a cumulative probability $P_{acc.j}$ that is greater than the target probability is obtained, obtain a $j^{th}$ delay segment counter when calculating the cumulative probability $P_{acc.j}$, and determine boundary values $D_{j-1}$ and $D_j$ of a delay interval corresponding to the $j^{th}$ delay segment counter; and search, between the boundary value $D_{j-1}$ and the boundary value $D_j$, for a node delay value that meets the target probability, and use, as a delay threshold, the node delay value that meets the target probability.

Figure 7:
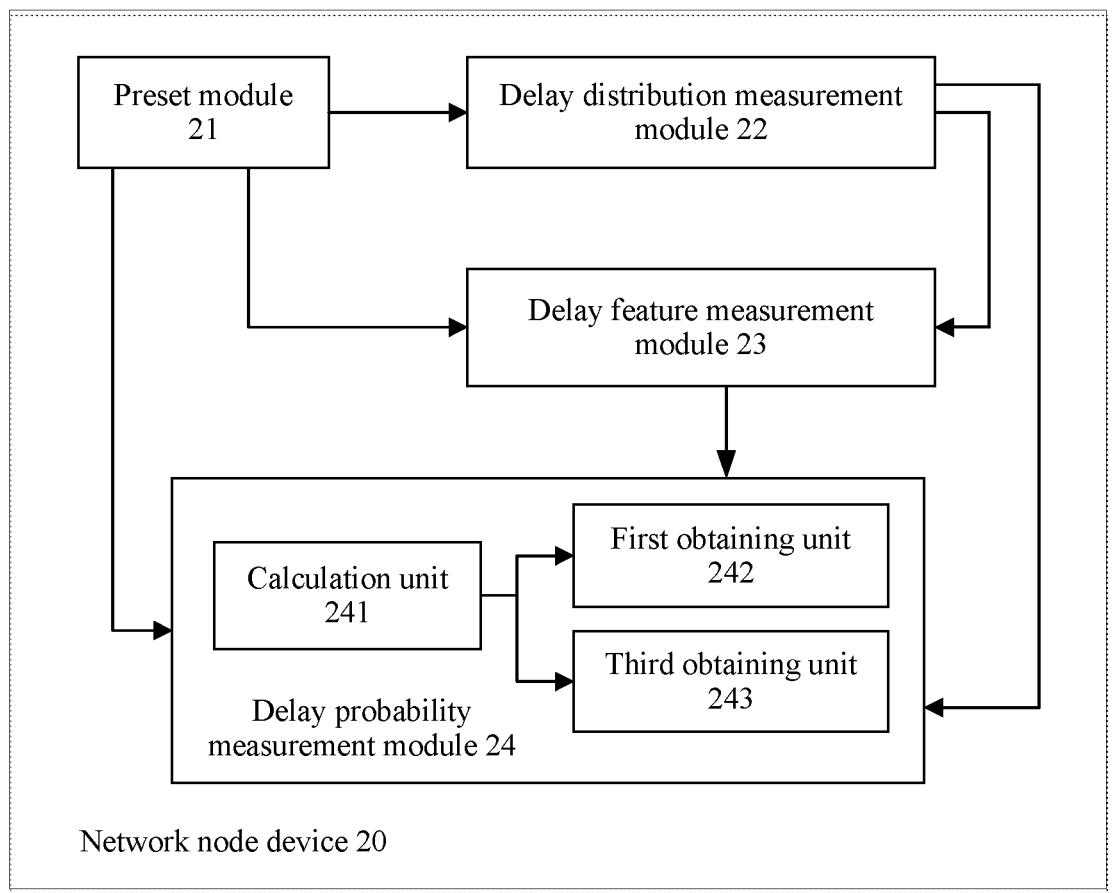
FIG. 7 is a schematic structural diagram of another delay measurement apparatus according to the present disclosure.

FIG. 7 is a schematic structural diagram of another delay measurement apparatus according to the present disclosure. The delay measurement apparatus 20 includes a preset module 21, a delay distribution measurement module 22, a delay feature measurement module 23, and a delay probability measurement module 24.

The preset module 21 is the same as the preset module 11 shown in FIG. 6, and the delay distribution measurement module 22 is the same as the delay distribution measurement module 12 shown in FIG. 6. Details are not described herein again.

The delay feature measurement module 23 is configured to: determine a maximum node delay value and a minimum node delay value in node delay values obtained in a preset time period; and determine a delay interval between the maximum node delay value and the minimum node delay value, and obtain a quantity of valid delay segment counters corresponding to the delay interval, where the valid delay segment counters are delay segment counters that perform counting in the preset time period; and obtain a probability density curve f(x) through fitting calculation based on a distribution function and values of a determined quantity of valid delay segment counters, and send the probability density curve f(x) to the delay probability measurement module 24, where x is a random variable and varies with the values of the determined quantity of valid delay segment counters.

The delay probability measurement module 24 includes a calculation unit 241, a first obtaining unit 242, and a third obtaining unit 243.

The calculation unit 241 is the same as the calculation unit 131 shown in FIG. 6, and the first obtaining unit 242 is the same as the first obtaining unit 132 shown in FIG. 6. Details are not described herein again.

The third obtaining unit 243 is configured to: when the delay probability measurement module obtains a cumulative probability $P_{acc.j}$ that is greater than a target probability, determine, on the probability density curve f(x), a node delay value that meets the target probability, and use, as a delay threshold, the node delay value that meets the target probability.

Based on each of the delay measurement apparatuses separately shown in FIG. 6 and FIG. 7 of the present disclosure, in one embodiment, the delay measurement apparatus may further include a classification module. The classification module is configured to classify the calculated node delay value of the current packet based on a forwarding priority of the current packet, an ID number of a service flow in which the current packet is located, or a port number of a port through which the current packet is input to the network node device. The delay measurement apparatus further performs corresponding measurement based on a category. For details, refer to a corresponding part of the delay measurement method disclosed in the present disclosure.

In one embodiment, each of the delay measurement apparatuses separately shown in FIG. 6 and FIG. 7 may be disposed inside the egress port of the network node device, or may be independently disposed outside the egress port of the network node device.

In one embodiment, each of the delay measurement apparatuses separately shown in FIG. 6 and FIG. 7 may be alternatively disposed in a network controller, and the network controller is connected to each network node device.

Figure 8:
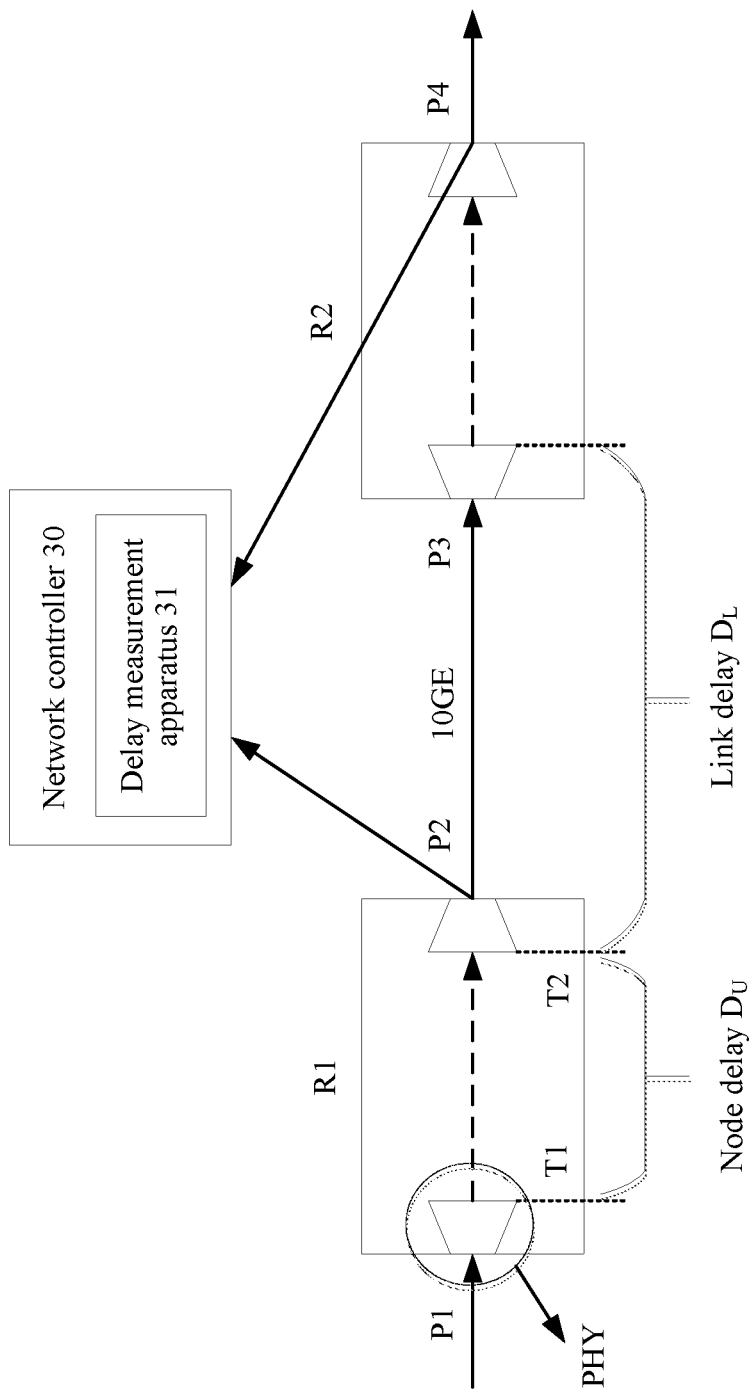
FIG. 8 is a schematic diagram of an application scenario of another delay measurement apparatus according to the present disclosure.

For example, in an application scenario shown in FIG. 8, a delay measurement apparatus 31 is disposed in a network controller 30, and the network controller is connected to a network node device R1 and a network node device R2. The network node device R1 and the network node device R2 separately send, to the network controller 30, respective node delay values that are obtained through calculation, and the delay measurement apparatus 31 disposed in the network controller performs corresponding measurement. In one embodiment, the delay measurement apparatus may be alternatively split into two parts: One part is disposed in the network controller, and the other part is disposed in the network node device. This is not limited in the present disclosure.

With reference to the delay measurement method disclosed in the embodiment of the present disclosure, the delay measurement apparatus disclosed in this embodiment of the present disclosure may also be implemented directly by using hardware, a memory executed by a processor, or a combination thereof.

Figure 9:
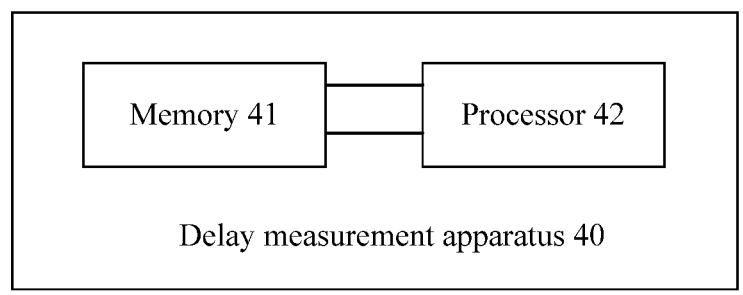
FIG. 9 is a schematic structural diagram of a delay measurement apparatus according to the present disclosure.

Therefore, the present disclosure further discloses another delay measurement apparatus 40 corresponding to the delay measurement method disclosed in the embodiment of the present disclosure. As shown in FIG. 9, the delay measurement apparatus 40 includes a memory 41 and a processor 42 that communicates with the memory 41.

The memory 41 has a storage medium, and the storage medium stores an operation procedure of performing delay measurement on a node delay value.

For the operation procedure of performing delay measurement on the node delay value, the operation procedure may include program code, and the program code may include a series of operating instructions sorted in a specific order. The processor may be a central processing unit CPU, or an application-specific integrated circuit, or one or more integrated circuits configured to implement this embodiment of the present disclosure.

The memory may include a high-speed RAM memory, and may further include a non-volatile memory, such as at least one magnetic disk memory.

The processor is connected to the memory by using a bus. When delay measurement needs to be performed on a node delay value of a network node device, the processor invokes the operation procedure of delay measurement that is stored in the memory. For the operation procedure, refer to measurement on the node delay value of the network node device in the delay measurement method disclosed in Embodiment 1 of the present disclosure or Embodiment 2 of the present disclosure. Details are not described herein again.

In conclusion, according to the delay measurement technical solutions disclosed in the present disclosure, delay measurement is performed on the node delay value received in the preset time period, and serviceability, availability, and reliability of delay performance of the network node device are evaluated based on delay measurement data. Therefore, comprehensive delay measurement data is obtained. Based on this, precise quantitative evaluation of serviceability, availability, and reliability of network node delays across an entire network can be completed.

Further, node delay data corresponding to a specific probability in the network node device may be provided.

Still further, delay measurement data of each network node device may be further used to monitor a rule that the network node delay varies with port traffic of the network node device, so that the rule is used to direct network expansion and upgrade.

The foregoing embodiments are merely optional embodiments of the present disclosure, and are not intended to limit the present disclosure. For a person skilled in the art, the present disclosure may have various modifications and changes. Any modification, equivalent replacement, or improvement made without departing from the spirit and principle of the present disclosure shall fall within the protection scope of the present disclosure.

What is claimed is:

1. A method of delay measurement of a network node device, the method comprising:

obtaining, by a delay measurement apparatus of the network node device, a node delay value of a current packet when a preset time period starts, wherein the node delay value is used to indicate a delay generated when the current packet is forwarded from an ingress port of the network node device to an egress port of the network node device;

determining, by the delay measurement apparatus based on M+1 boundary values of preset M delay intervals, a delay interval of M delay segment counters in which the node delay value is located, and adding 1 to a value of a delay segment counter corresponding to the delay interval in which the node delay value is located, wherein M>1, M is a positive integer, the delay interval in which the node delay value is located belongs to the M delay intervals, and each delay interval corresponds to one of the M delay segment counters;

obtaining, by the delay measurement apparatus, a node delay value of a next packet until the preset time period ends; and determining, by the delay measurement apparatus, a cumulative probability $P_{acc,j}$ that is greater than or equal to a target probability, and obtaining, as a delay threshold, a node delay value having the target probability, wherein the cumulative probability $P_{acc,j}=C_{acc,j}/C_{total}$, $C_{acc,j}$ is a sum obtained by accumulating from a value of a first delay segment counter to a value of a $j^{th}$ delay segment counter, $1 \leq j \leq M$, j is a positive integer, and $C_{total}$ is a sum $C_{total}$ of values of the M delay segment counters in the preset time period;

wherein the values of the delay segment counters are obtained based on the packets forwarded from the ingress port to the egress port of the network node device during the preset time period, wherein the values of the delay segment counters are accumulated until the cumulative probability $P_{acc,j}$ is greater than or equal to the target probability, wherein determining the cumulative probability $P_{acc,j}$ that is greater than or equal to the target probability and obtaining the node delay value having the target probability comprise:

when obtaining the cumulative probability $P_{acc,j}$ that is equal to the target probability, obtaining, by the delay measurement apparatus, as the delay threshold, the node delay value having the target probability; and when obtaining the cumulative probability $P_{acc,j}$ that is greater than the target probability, obtaining, by the delay measurement apparatus, the $j^{th}$ delay segment counter when calculating the cumulative probability $P_{acc,j}$; determining boundary values $D_{j-1}$ and $D_j$ of a delay interval corresponding to the $j^{th}$ delay segment counter; searching, between the boundary value $D_{j-1}$ and the boundary value $D_j$, for the node delay value having the target probability; and using, as the delay threshold, the node delay value having the target probability.

2. The method according to claim 1, further comprising:
determining, by the delay measurement apparatus, a maximum node delay value and a minimum node delay value in node delay values obtained in the preset time period;
determining, by the delay measurement apparatus, a delay interval between the maximum node delay value and the minimum node delay value, and obtaining a quantity of valid delay segment counters corresponding to the delay interval between the maximum node delay value and the minimum node delay value, wherein the valid delay segment counters are delay segment counters that perform counting in the preset time period; and
obtaining, by the delay measurement apparatus, a probability density curve f(x) through fitting calculation based on a distribution function and values of the quantity of valid delay segment counters, wherein x is a random variable and varies with the values of the quantity of valid delay segment counters.

3. The method according to claim 2, further comprising:
calculating, by the delay measurement apparatus, an average delay value of the node delay values that are of all packets and that are obtained in the preset time period; and
determining, by the delay measurement apparatus, a node delay value corresponding to the average delay value on the probability density curve f(x), wherein the node delay value corresponding to the average delay value is used to measure node delay performance of the network node device.

4. The method according to claim 1, further comprising:
classifying, by the delay measurement apparatus, the node delay value of the current packet based on a forwarding priority of the current packet, an ID number of a service flow in which the current packet is located, or a port number of a port through which the current packet is input to the network node device.

5. A delay measurement apparatus included in a network node device, the delay measurement apparatus comprising:
a non-transitory memory storing instructions; and
a processor coupled to the non-transitory memory, the processor executes the instructions stored in the non-transitory memory to cause the delay measure apparatus to:
obtain a node delay value of a current packet when a preset time period starts, wherein the node delay value is used to indicate a delay generated when the current packet is forwarded from an ingress port of the network node device to an egress port of the network node device;
determine, based on M+1 boundary values of preset M delay intervals, a delay interval in which the node delay value is located, and add 1 to a value of a delay segment counter of M delay segment counters corresponding to the delay interval in which the node delay value is located, wherein M>1, M is a positive integer, the delay interval in which the node delay value is located belongs to the M delay intervals, and each delay interval corresponds to one of the M delay segment counters;
obtain a node delay value of a next packet until the preset time period ends, and send a value of each delay segment counter; and
determine a cumulative probability $P_{acc,j}$ that is greater than or equal to a target probability, and obtain, as a delay threshold, a node delay value having the target probability, wherein the cumulative probability $P_{acc,j}=C_{acc,j}/C_{total}$, $C_{acc,j}$ is a sum obtained by accumulating from a value of a first delay segment counter to a value of a $j^{th}$ delay segment counter, $1 \leq j \leq M$, j is a positive integer, and $C_{total}$ is a sum $C_{total}$ of values of the M delay segment counters in the preset time period;
wherein the values of the delay segment counters are obtained based on the packets forwarded from the ingress port to the egress port of the network node device during the preset time period, wherein the values of the delay segment counters are accumulated until the cumulative probability $P_{acc,j}$ is greater than or equal to the target probability,
wherein the processor executes the instructions stored in the non-transitory memory to further cause the delay measurement apparatus to:
when obtaining the cumulative probability $P_{acc,j}$ that is equal to the target probability, obtain, as the delay threshold, the node delay value having the target probability; and
when obtaining the cumulative probability $P_{acc,j}$ that is greater than the target probability, obtain the $j^{th}$ delay segment counter when calculating the cumulative probability $P_{acc,j}$, and determine boundary values $D_{j-1}$ and $D_j$ of a delay interval corresponding to the $j^{th}$ delay segment counter; and search, between the boundary value $D_{j-1}$ and the boundary value $D_j$, for the node delay value having the target probability, and use, as the delay threshold, the node delay value having the target probability.

6. The delay measurement apparatus according to claim 5, wherein the processor executes the instructions stored in the non-transitory memory to further cause the delay measurement apparatus to:
determine a maximum node delay value and a minimum node delay value in node delay values obtained in the preset time period; determine a delay interval between the maximum node delay value and the minimum node delay value, and obtain a quantity of valid delay segment counters corresponding to the delay interval between the maximum node delay value and the minimum node delay value, wherein the valid delay segment counters are delay segment counters that perform counting in the preset time period; and obtain a probability density curve f(x) through fitting calculation based on a distribution function and values of the quantity of valid delay segment counters wherein x is a random variable and varies with the values of the quantity of valid delay segment counters.

7. A non-transitory computer readable medium having instructions stored therein, which when executed by a processor of a delay measurement apparatus, cause the processor to perform operations, the operations comprising:
obtaining a node delay value of a current packet when a preset time period starts, wherein the node delay value is used to indicate a delay generated when the current packet is forwarded from an ingress port of the network node device to an egress port of the network node device;
determining, based on M+1 boundary values of preset M delay intervals, a delay interval in which the node delay value is located, and adding 1 to a value of a delay segment counter of M delay segment counters corresponding to the delay interval in which the node delay value is located, wherein M>1, M is a positive integer, the delay interval in which the node delay value is located belongs to the M delay intervals, and each delay interval corresponds to one of the M delay segment counters;

obtaining a node delay value of a next packet until the preset time period ends; and determining a cumulative probability $P_{acc,j}$ that is greater than or equal to a target probability, and obtaining, as a delay threshold, a node delay value having the target probability, wherein the cumulative probability $P_{acc,j}=C_{acc,j}/C_{total}$, $C_{acc,j}$ is a sum obtained by accumulating from a value of a first delay segment counter to a value of a $j^{th}$ delay segment counter, $1<j\leq M$, j is a positive integer, and $C_{total}$ is a sum $C_{total}$ of values of the M delay segment counters in the preset time period;

wherein the values of the delay segment counters are obtained based on the packets forwarded from the ingress port to the egress port of the network node device during the preset time period, wherein the values of the delay segment counters are accumulated until the cumulative probability $P_{acc,j}$ is greater than or equal to the target probability, wherein determining the cumulative probability $P_{acc,j}$ that is greater than or equal to the target probability and obtaining the node delay value having the target probability comprise:

when obtaining the cumulative probability $P_{acc,j}$ that is equal to the target probability, obtaining, by the delay measurement apparatus as the delay threshold, the node delay value having the target probability; and when obtaining the cumulative probability $P_{acc,j}$ that is greater than the target probability, obtaining, by the delay measurement apparatus, the $j^{th}$ delay segment counter when calculating the cumulative probability $P_{acc,j}$; determining boundary values $D_{j-1}$ and $D_j$ of a delay interval corresponding to the $j^{th}$ delay segment counter; searching, between the boundary value $D_{j-1}$ and the boundary value $D_j$, for the node delay value having the target probability; and using, as the delay threshold, the node delay value having the target probability.

8. The non-transitory computer readable medium according to claim 7, wherein the operations further comprise:

determining a maximum node delay value and a minimum node delay value in node delay values obtained in the preset time period;

determining a delay interval between the maximum node delay value and the minimum node delay value, and obtaining a quantity of valid delay segment counters corresponding to the delay interval between the maximum node delay value and the minimum node delay value, wherein the valid delay segment counters are delay segment counters that perform counting in the preset time period; and obtaining a probability density curve f(x) through fitting calculation based on a distribution function and values of the quantity of valid delay segment counters, wherein x is a random variable and varies with the values of the quantity of valid delay segment counters.

9. The non-transitory computer readable medium according to claim 8, wherein the operations further comprise:

calculating an average delay value of the node delay values that are of all packets and that are obtained in the preset time period; and determining a node delay value corresponding to the average delay value on the probability density curve f(x), wherein the node delay value corresponding to the average delay value is used to measure node delay performance of the network node device.

10. The non-transitory computer readable medium according to claim 7, wherein the operations further comprise:

classifying the node delay value of the current packet based on a forwarding priority of the current packet, an ID number of a service flow in which the current packet is located, or a port number of a port through which the current packet is input to the network node device.

* * * * *